United States Patent [19]

Cohen et al.

[11] 3,815,099

[45] June 4, 1974

[54] DATA PROCESSING SYSTEM

[75] Inventors: John B. Cohen, West Acton; Paul E. Janson, Boston, both of Mass.; Harold L. McFarland, Jr., Santa Clara, Calif.; James B. Young, Jr., Carlisle, Mass.

[73] Assignee: Digital Equipment Corporation, Maynard, Mass.

[22] Filed: Sept. 20, 1972

[21] Appl. No.: 290,644

Related U.S. Application Data

[62] Division of Ser. No. 24,636, April 1, 1970, Pat. No. 3,710,324.

[52] U.S. Cl. .............................................. 340/172.5

[51] Int. Cl. ........................... G06f 3/04, G06f 13/00

[58] Field of Search .......... 340/172.5, 147; 235/152

[56] References Cited

UNITED STATES PATENTS

| | | | |
|---|---|---|---|
| 3,480,914 | 11/1969 | Schlaeppi | 340/172.5 |
| 3,512,136 | 5/1970 | Harmon et al. | 340/172.5 |
| 3,566,363 | 2/1971 | Driscoll | 340/172.5 |
| 3,593,300 | 7/1971 | Driscoll et al. | 340/172.5 |
| 3,614,740 | 10/1971 | Delagi et al. | 340/172.5 |
| 3,614,741 | 10/1971 | McFarland et al. | 340/172.5 |
| 3,710,324 | 1/1973 | Cohen et al. | 340/172.5 |

*Primary Examiner*—Paul J. Henon
*Assistant Examiner*—Jan E. Rhoads
*Attorney, Agent, or Firm*—Cesari and McKenna

[57] ABSTRACT

A data processing system with improved data transfer capabilities. All units in the system including a random access memory unit, are connected in parallel. Data is transferred between any two units asynchronously with respect to a processor unit which normally controls the system. Other units can obtain system control by making a request which is honored if it has sufficient priority. Transfers requiring processor unit operation are made after an instruction is processed and may divert the processor unit to an interruption routine. Other transfers can be made whenever another unit in the system is not making a transfer. System control is returned to the processor unit or another peripheral unit when the data transfer is completed. If an interruption routine is to be executed, control is returned to the processor directly. Data transfers are controlled by synchronization signals from the controlling peripheral unit and the other unit involved in the transfer.

10 Claims, 21 Drawing Figures

DATA PROCESSING SYSTEM

CROSS REFERENCES TO RELATED APPLICATIONS

This is a division of U.S. Pat. application Ser. No. 24,636, filed Apr. 1, 1970, now U.S. Pat. No. 3,710,324, by John B. Cohen et al. and assigned to the assignee of the present invention and issued Mar. 30, 1973 as U.S. Pat. No. 3,710,324.

BACKGROUND OF THE INVENTION

1. Field of Invention

This invention generally relates to data processing systems and more specifically to the interconnection of a processor unit, a memory and peripheral units in a system.

2. Discussion of Prior Art

A data processing system usually includes a processor unit which executes instructions that are stored at addresses or locations in a memory. These instructions are transferred to the processor unit sequentially under the control of a program counter. The data that is processed is transferred into and out of the system by way of input/output devices, or peripheral units, such as teletypewriters, tape punchers or card readers. Usually, the data is temporarily stored in the memory before and after the processing.

There are several ways to convey data between a peripheral unit and a memory unit or processor unit. Two popular methods are implemented by conveying data through input/output control units or directly with the memory.

In the first method, the processor unit and an operatively associated input/output control unit provide information transfers in response to separate input/output instructions. The existence of these instructions, in addition to normal operating instructions, increases programming and processor unit complexity. Peripheral units respond only to input/output instructions and not to operating instructions. System efficiency is reduced by various amounts because each operation involving a transfer from a peripheral unit requires the execution of an input/output instruction and then of an operating instruction. This decrease in system efficiency could be avoided if peripheral units, the memory and processor unit responded to one set of instructions and if all units responded to the same instructions. However, the decrease is accepted in many systems when information is transferred to and from a first category of peripheral units including teletypewriters, card punchers and card readers which transfer data at relatively slow rates.

System operation becomes unacceptable if this first method is used to transfer information between the memory unit and a second category of peripheral units including magnetic drums, discs and tape machines. These peripheral units transfer large quantities of data at relatively fast rates, usually in groups of "words" each comprising a fixed number of bits. It is apparent that the input/output instructions required to transfer a single "word" do not enable large quantities of information to be moved efficiently.

Direct memory transfers, the second method, do permit large quantities of information to be moved between the memory and a peripheral unit with greatly increased efficiency. Some preliminary processor unit action is necessary for each direct memory transfer.

Usually some instructions or other signals start and stop the transfer, and these signals require an interruption of processor unit operation and synchronous transfers. The resulting system inefficiency is intolerable if direct memory transfers are made with peripheral units in the first category, i.e., one word at a time. However, when large quantities of data are to be moved into or out of a memory unit, direct memory transfers increase system operating efficiency considerably.

Many data processing systems incorporate both methods to obtain efficient system communications and operations. That is, peripheral units characterized by slow transfer rates communicate synchronously through the input/output control unit while other peripheral units use direct memory transfers. Significant processor time and circuitry are still necessary, however. Peripheral units operating with input/output instructions and those operating with direct memory transfers are coupled to the memory through multiplexing circuits, for example. Processor unit efficiency is also reduced with combined systems because the transfers are made synchronously and depend upon processor unit execution of at least some preliminary instructions for both types of transfer.

In addition to having efficient data and instruction transfer times, it may also be desirable to control the data processing system from a peripheral unit. In most data processing systems the processor unit always controls the system. Even where the processor unit does relinquish control, several preliminary processor unit operations are usually necessary. These operations interrupt current processor unit operations and tend to reduce system efficiency.

Therefore, it is an object of this invention to provide a data processing system in which one set of instructions controls data transfers to and from peripheral units, a processor unit and the memory.

Another object of this invention is to provide a data processing system in which the processor unit and each peripheral unit respond to the same instructions.

Yet another object of this invention is to provide a data processing system in which each peripheral unit transfers data asynchronously with respect to the processor unit.

Yet still another object of this invention is to provide a data processing system in which direct transfers between a peripheral unit and the memory are made independently of the processor unit.

Still another object of this invention is to provide a data processing system in which a peripheral unit can control the system.

Still yet another object of this invention is to provide a data processing system in which preliminary operations required to transfer control to a peripheral unit occur simultaneously with other processor unit operations.

SUMMARY

In accordance with this invention, the processor unit and all peripheral units are connected to a single interconnecting bus over which all data transfers take place. A peripheral unit can request control of the system. If the request is granted, the requesting peripheral unit is selected. At an appropriate time it obtains control, and later, when the peripheral unit completes its operations, control is returned to the processor unit.

This invention is pointed out with particularity in the appended claims. An understanding of the above and further objects and advantages of this invention may be obtained by referring to following description taken in conjunction with the drawings.

DESCRIPTION OF AN ILLUSTRATIVE EMBODIMENT

General Description

Figure 1:
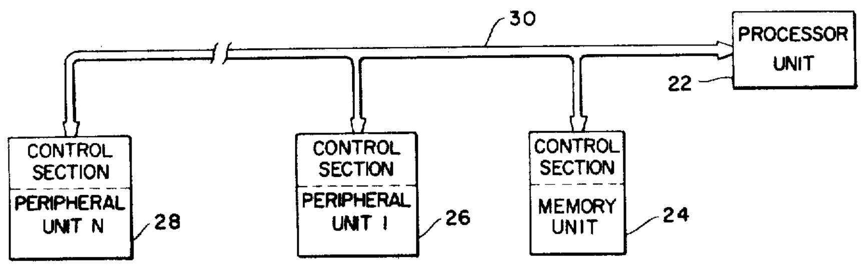
FIG. 1 illustrates a data processing system adapted to implement this invention.

The data processing system illustrated in FIG. 1 includes a processor unit 22, a random access memory unit 24 and a plurality of peripheral units, such as peripheral units 26 and 28. The various units are interconnected by a bidirectionally conducting bus 30 to permit direct data and instruction transfers between them. Each peripheral unit and memory unit includes a control section containing data buffer registers, address decoding circuits for selection purposes, means for storing interrupting vectors and other circuit elements necessary for unit control. Certain details of these control sections are described in more detail later.

Processor Unit

Figure 2:
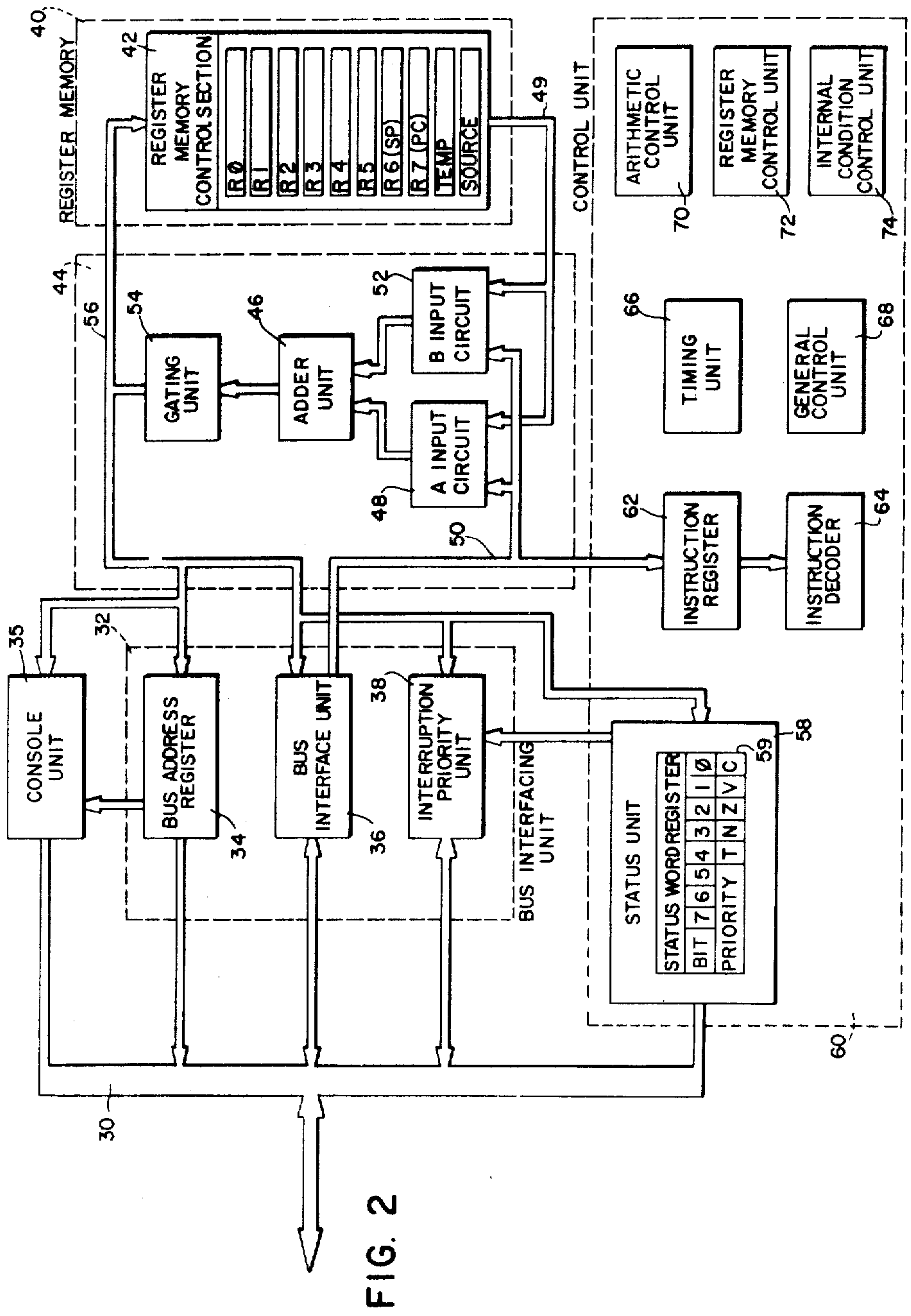
FIG. 2 is a schematic of the processor unit shown in FIG. 1.

The processor unit 22 is shown in FIG. 2. It is coupled to the bus 30 through a plurality of connections. The primary connection is through a bus interfacing unit 32 comprising a bus address register 34, a bus interface unit 36 and an interruption priority unit 38. Information in the form of data or instructions is transmitted to or received from locations constituted by the peripheral units or memory unit. Each location is defined by an address in the bus address register 34; and the data or instruction is transferred over the bus 30.

The bus address register 34 also transfers information with a console unit 35 coupled to the bus 30. This enables the contents of the bus address register 34 to be transferred to the console unit 35 for display purposes or an address to be supplied by the console unit 35 to bus 30 for testing purposes.

A register memory 40 comprises a control section 42 and a plurality of storage registers identified as R$\phi$ through R7, TEMP and SOURCE. The R7 register is the program counter and is identified as either the R7 or PC register depending upon its function. The R6 register is designated as an SP register when it functions to identify contiguous memory unit locations.

Still referring to FIG. 2, an arithmetic unit 44 includes an adder unit 46 and two input circuits. The A and B input circuits 48 and 52 each receive inputs from the register memory 40 on a bus 49 and from the bus interface unit 36 on a bus 50. Output signals from the adder unit 46 are transmitted through a gating unit 54 with rotating and shifting capabilities onto a bus 56. The bus 56 is coupled to bus address register 34, bus interface unit 36, the interruption priority unit 38, the register memory 40 and a status unit 58. The status unit 58 includes a status word register 59 and is located in a control unit 60.

The eight-bit status register 59 is shown in FIG. 2 and stores the least significant eight bits on the bus 30 when they define the processor priority, previous operations and whether the processor unit 22 can be stopped or "trapped" after an instruction. Specifically, the priority bits (bits 5, 6 and 7) define one of eight priorities. A T bit (bit 4) may be set to provide trapping. An N bit (bit 3) may be set if the result of the previous instruction was negative, while a Z bit (bit 2) may be set for zero results. A V bit (bit 1) may be set when an arithmetic overflow occurs while a C bit (bit $\phi$) may be set when a carry is generated by the adder unit 46 for the most significant bit.

Information transfers within the processor unit 22 are supervised by the control unit 60. Generally, instructions are coupled from the bus 50 to an instruction register 62 for decoding in an instruction decoder 64 in response to signals from a timing unit 66 and a general control unit 68. The timing signals and signals from the instruction decoder 64 and the general control unit 68 are also coupled to an arithmetic control unit 70 which controls the various units in the arithmetic unit 44.

Operations in the register memory 40 are controlled by a register memory control unit 72. Internal computer operating conditions are monitored by an internal condition control unit 74 which also responds to other signals in the control unit 60. Signals indicating the existence of certain internal conditions can be coupled through the B input circuit 52, adder unit 46 and gating unit 54 onto the bus 56.

Before describing the details necessary to a complete understanding of this invention, it will be helpful to review how the processor unit 22 transfers information in response to various instructions. During a "fetch" cycle, described in detail with reference to FIG. 6, the control unit 60, including the arithmetic control unit 70 and the register memory control unit 72, transfers the program count from the PC register (the R7 register in the register memory 40) through the B input circuit 52, the adder unit 46, and gating unit 54 to the bus address register 34 without modification. The program count is then incremented and returned to the PC register 54. Then the instruction in the location addressed by the bus address register 34 is obtained with a transfer of information over the bus (hereinafter a "bus operation")

and coupled through the bus interface unit 36 into the instruction register 62. After the instruction is decoded in the instruction decoder 64, the control unit 60 completes the "fetch" cycle with some additional bus operations.

If the instruction is one of several control instructions, the control unit 60 may cause the processor unit 22 to divert to either an "execute" or a "term" cycle. If the instruction contains an operand address, it is decoded and the operand, usually data, defined by the operand address, is transferred from the memory unit to the processor unit with a bus operation.

After the data has been transferred to the processor unit 22, either a "term" or "execute" cycle completes processor unit operation. The "execute" cycle operates on the data retrieved during the "fetch" cycle in accordance with the operation code. During the "term" cycle, the processor unit 22 determines whether any conditions exist which require diversion to an interruption routine. Both the "execute" and "term" cycles may include additional bus operations.

Memory Unit

Figure 3:
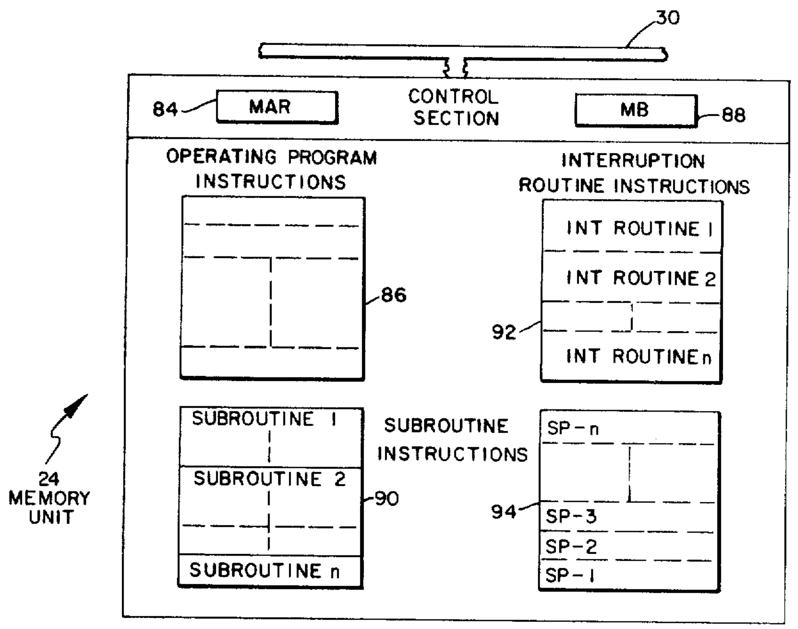
FIG. 3 illustrates an embodiment of the memory unit shown in FIG. 1.

A typical organization for the memory unit 24 is shown in FIG. 3. Addresses from the bus address register 34 (FIG. 2) are coupled to a memory address register (MAR) 84. If instructions or data are being transferred to the memory unit, then they are transferred through a memory buffer (MB) 88 to the designated locations. Instructions or data in memory locations are transferred from the designated memory locations through the memory buffer 88 onto the bus 30.

The memory unit 24 is divided arbitarily into blocks, or groups of contiguous memory locations, for storing related instructions in sequential order, and random locations. For example, the memory locations which comprise block 86 store operating program instructions. These locations are normally addressed by the PC register. A subroutine transfer (JSR) instruction contains an address for block 90 which stores the various subroutine instructions. Interruption routine instructions are stored in a block 92 of contiguous memory locations. Block 94 stores the PC register contents and status register contents, saved when a subroutine or interruption routine is initiated, at locations identified by the SP (or R6) register contents.

Referring now to FIGS. 2 and 3, a first bus operation moves an instruction for an operating program from a location in the block 86 after the PC register contents are transferred through the arithmetic unit 44 to the bus address register 34. The addressed instruction is transferred to the instruction register 62 and the instruction decoder 64. If the instruction contains an operand address, the contents of the designated register are transferred through the B input circuit 52 and the arithmetic unit 44 onto the bus 56. If the arithmetic unit output on the bus 56 is data, the data is transferred to an address defined by the instruction and stored in the bus address register.

If the arithmetic unit output is an address, it is transferred to the bus address register 34. The contents of the addressed location are transferred to the A or B input circuits 48 or 52 as data or as another address with another bus operation. Understanding the details of addressing is not necessary to understand this invention. Additional details related to addressing used in the processor unit of FIG. 2 can be obtained by referring to a copending U.S. Pat. application Ser. No. 21, 973, entitled "Data Processing System With Instruction Addresses Identifying One of a Plurality of Registers Including the Program Counter," filed May 23, 1970, now U.S. Pat. No. 3,614,741, and assigned to the same assignee as the present invention.

Peripheral Units

Figure 4:
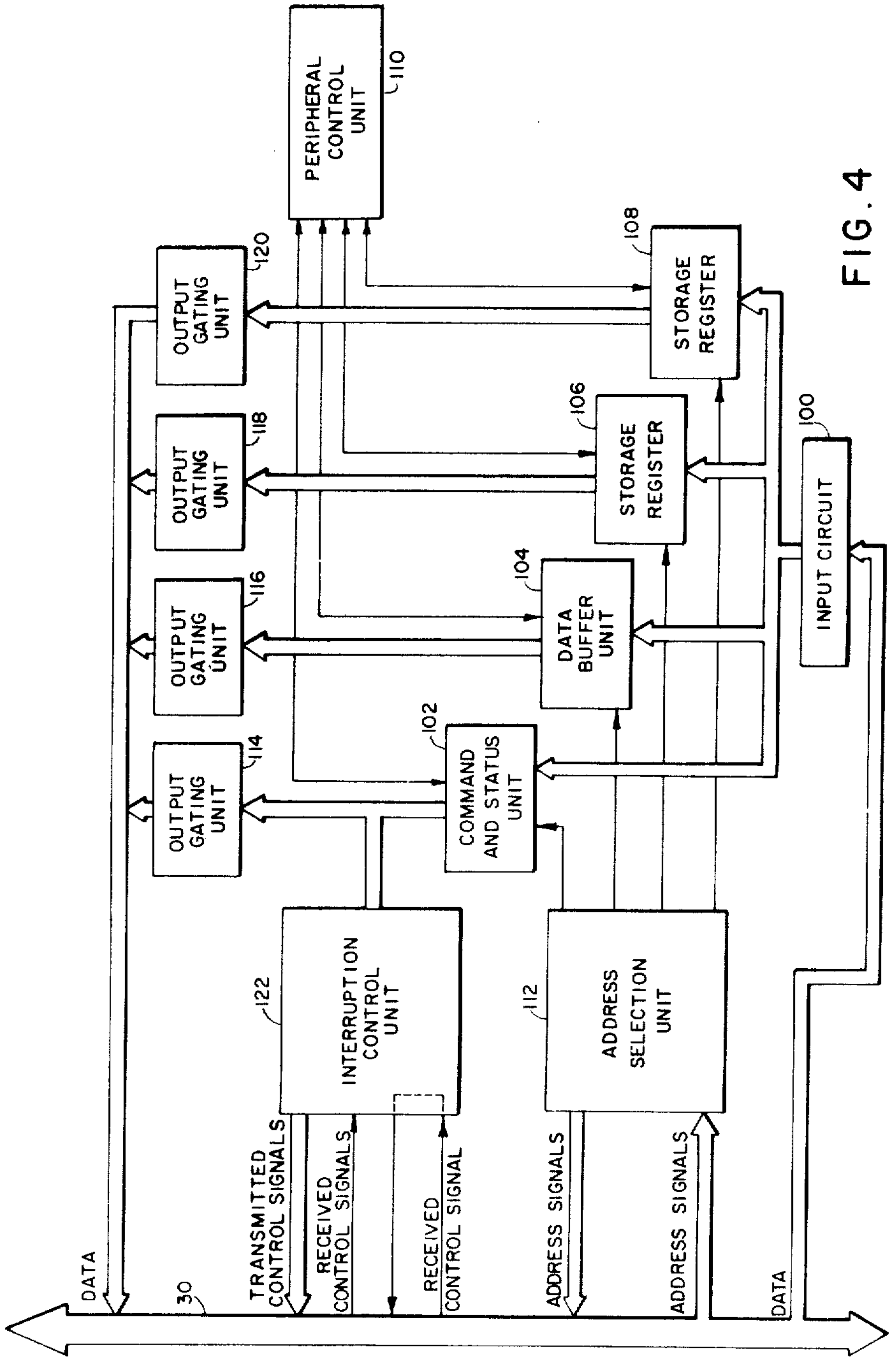
FIG. 4 is a schematic of a typical peripheral unit shown in FIG. 1.

The schematic in FIG. 4 represents a typical peripheral unit for transmitting and receiving information. Data transmitted to the peripheral unit over the bus 30 is routed to one of several storage registers through an input circuit 100. Each storage register retains a particular kind of information. For example, signals in a command and status register 102 indicate various internal peripheral unit conditions. If a computer word comprises several peripheral unit words, a data buffer 104 may accumulate peripheral unit words to form a computer word or store a computer word until the peripheral unit uses all the peripheral unit words. Various instructions or other data may be transferred to and from the peripheral unit by way of storage registers 106 and 108. Each register is also coupled to a control unit 110 which includes operating control circuitry for the peripheral unit.

When a data processing system comprises several peripheral units or a peripheral unit comprises several internal storage locations, addresses identify the proper unit or internal location. Addressing signals are coupled to an address selection unit 122 which is responsive to a single address or one of a group of addresses. This unit controls the input circuit 100 and the registers 102, 104, 106 and 108 to route input information to the proper location.

Information can also be moved onto the bus 30 from the peripheral unit shown in FIG. 4 by accumulating it in one of the registers 102, 104, 106 and 108. Each register is coupled through one of the output gating circuits 114, 116, 118 and 120 onto the bus 30. When one output gating circuit is enabled, the information in the corresponding register is coupled onto the bus 30.

An interruption control unit 122 receives and transmits various control signals from and to other units in the data processing system. If the peripheral unit is ready to transmit data, the interruption control unit 122 generates and receives the various signals to transfer the information onto the bus 30 at the proper time. It also controls the transfer of addresses from and to the address selection unit 112.

Hence, the peripheral unit shown in FIG. 4 transmits and receives data, addresses, and various control signals to and from the bus 30. As becomes more apparent in the following discussion, especially with reference to FIGS. 12 and 13, the peripheral unit is capable of transmitting and receiving data or other information under the supervision of another unit in the data processing system or under its own control.

Interconnecting Bus

All units in the data processing system shown in FIG. 1 are interconnected by the bus 30. This bus is generally designated as a bidirectionally conducting bus because information is transferred to and from units over the bus. As shown more specifically in FIG. 5, the bus 30 comprises several wires each reserved for a specific purpose. One group of wires conducts DATA signals; another, ADDRESS signals. Both groups conduct signals bidirectionally. Within the control group of wires, some are bidirectionally conducting (wires for the BUSY, CYCLE CONTROL, MYSN and SSYN signals) while other wires couple the BR, NPR, SACK and INTR signals to the processor unit 22 (FIG. 1). The processor unit 22 always transmits BG and NPG signals. The functions of each signal are described later.

Generally, each signal applied to the bus 30 is coupled to all units in the data processing system. Only the addressed unit is enabled to receive the information, however. While this invention is described in terms of a "bus," it is apparent that any interconnection of units in a system is possible. Therefore, "bus" is used to denote any interconnecion between units for conveying signals.

System Operation

Information comprising data or instructions can be transferred between any two units in the data processing system of FIG. 1. In any transfer, one unit controls the transfer and is designated as a master unit; the other unit involved in the transfer becomes a slave unit. Once a master unit-slave unit relationship is established, information can be transferred to or from the master unit under its control. Information is transferred to the master unit by a DATa Input (DATI) bus operation. A DATa Output (DATO) bus operation transfers the information from the master unit to the slave unit.

Figure 13:
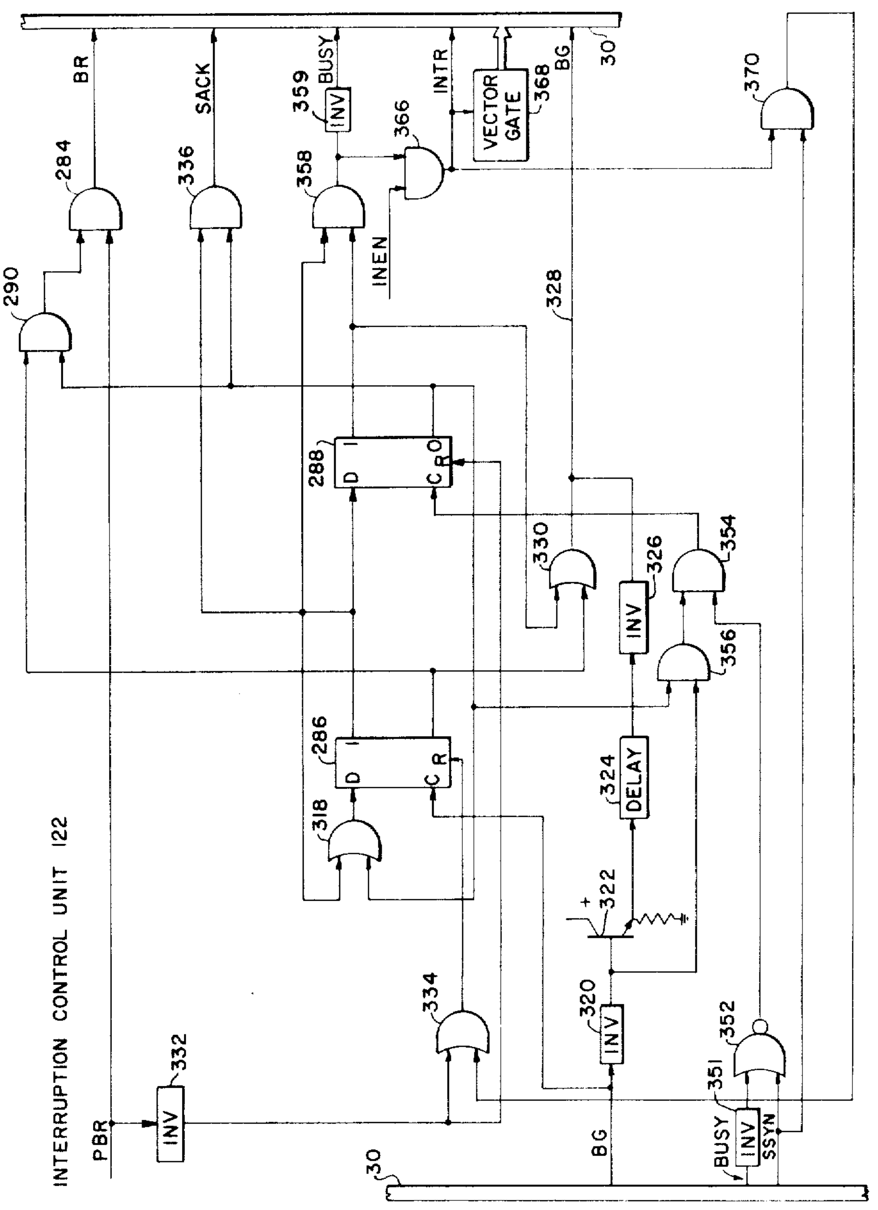
FIG. 13 is a schematic of an interruption control unit for use in the peripheral unit of FIG. 4.

Any unit in the system can become a master unit or a slave unit except the memory unit 24 (FIG. 1), which normally never requires system control and is usually always a slave unit. As a result, many circuit elements described with reference to FIG. 4 and later with reference to FIG. 13 are not necesary in a memory unit. During most operations, the processor unit is a master unit while peripheral units, such as that shown in FIG. 4, act as slave units.

Referring to FIGS. 2 and 4, information in the register 106, for example during a transfer interval is transferred to the processor unit 22 by a DATI bus operation. Initially, the processor unit 22, as the master unit, transfers an address onto the ADDRESS lines of the bus 30 from the bus address register 34. Bus operation or cycle control signals indicating the processor unit 22 is performing a DATI operation are also transmitted over the bus interface unit 36. A delayed first or master synchronization signal is transmitted to the slave unit from the bus interface 36.

When the slave unit sees the address, cycle control and master synchronization signals at the address selection unit 112, the output gating unit 118 is enabled and an data unit cycle begins; during the cycle the signals representing information in the register 106 energize the DATA lines of the bus 30. After the DATA lines are energized, the address selection unit 112 generates a second or slave indicating the end of the data unit cycle synchronization signal. When this signal is received by the master unit during a DATI bus operation, it indicates that information is on the bus 30. The processor unit 22 enables the bus interface unit 36 to accept the information for processing. Once the data is in the processor unit 22, the bus interface unit 36 stops transmitting the master synchronization signal. The DATI bus operation and the transfer interval are completed when the bus address register 34 and the bus interface unit 36 stop sending the address and cycle control signals and when the address selection unit 112 stops sending the slave synchronization signal.

If the processor unit 22 is to perform a series of DATI bus operations, a second DATI bus operation may be started before the first is completed. The address and cycle control signals for the second DATI bus operation are transferred onto the bus 30 as soon as the processor unit 22 stops sending the address and control signals for the first DATI bus operation. Generating the master synchronization signal for the second DATI bus operation is delayed until the slave synchronization signal received by the master unit indicates the end of the first DATI bus operation.

Information taken from a destructive read-out device, such as a core memory unit, is normally restored immediately after the information is transferred onto the bus 30 during a DATI bus operation. In some cases, information is not destroyed. In other cases, new information is returned to the same location immediately so the loss is acceptable. With these two situations, restoring the information is not necessary, and a modified bus operation is performed by the master unit. In this operation, identified by the cycle control signals as a DATa Input-Pause (DATIP) bus operation, the information is not restored. As described later, transfers from the master unit after previous DATIP operation are modified accordingly.

Consider that the processor unit 22 as a master unit must transfer information to the register 106 in the peripheral unit of FIG. 4. A DATa Output (DATO) bus operation is produced by the processor unit 22. Initially, the address for the register 106, the cycle control signals identifying the bus operation and the data are transferred onto the bus 30. The address is obtained from the bus address register 34; the bus operation signals and the data are obtained from the bus interface unit 36. Then the bus interface unit 36 produces a master synchronization signal. When the address selection unit 112 receives the master synchronization signal, decodes the address and bus operation signals, it enables the input circuit 100 and transfers the information to the register 106. The address selection unit 112 also transmits a slave synchronization signal back to the processor unit 22, specifically the bus interface unit 36, which indicates that the information has been received. The master unit, the processor unit 22, responds to the slave synchronization signal by stopping transmission of the master synchronization signal and then the address, cycle control and data signals. When the slave unit senses that the master unit has stopped transmitting the master synchronization signal, it stops transmitting the slave synchronization signal; and the DATO bus operation is completed.

Normally, a peripheral unit acting as a slave unit clears the storage location before receiving the information. If a DATO operation follows a DATIP operation, these steps are modified. When a DATIP operation has preceded the DATO operation, the location has been cleared already. The DATO operation is modified by omitting the clearing step thereby eliminating the restoring and clearing steps when DATIP and DATO operation are combined.

While the processor unit 22 usually controls the system, there are situations when other peripheral units control the system. For example, a magnetic disk unit becomes a master unit for transfers directly to or from a slave unit such as the memory unit 24 or another disk memory. When a peripheral unit is ready to assume system control, it makes a request over one of several request lines in the bus 30. The interruption priority unit 38, shown in this embodiment as part of the processor unit 22, compares this request with existing system operations. If the requesting device has sufficient priority, the request is accepted and the interruption priority unit 38 generates a selection or granting signal.

At this time, the requesting peripheral unit does not control the system. When the selection or granting signal is received, the peripheral unit generates an acknowledgement signal which is transmitted through the bus interface unit 36 to the general control unit 68. When the unit currently acting as a master unit completes a current operation, it stops sending a signal indicating its control; and the selected peripheral unit senses the absence of the signal and assumes control by generating a comparable signal indicating that it is a new master unit and that a transfer interval has begun.

When the new master unit completes its operation, it stops sending its signal indicating system control thereby indicating that a transfer interval has been completed. In most situations, this returns control to the processor unit 22. If another peripheral unit has been selected as a master unit by the requesting, granting and acknowledgement signals in the meanwhile, the other peripheral unit becomes the master rather than the processor unit. These transfers of system control are classified as passive transfers.

The processor unit can also become the master unit by an active transfer. If a peripheral unit, as a master unit, requires the processor unit 22 to process an interruption routine, the peripheral unit transmits an interrupting signal and address onto the bus 30. This address can be stored as a fixed set of signals for transmission onto the DATA lines of the bus 30 under the control of the interruption control unit 122 which also generates the interrupting signal. Both signals are coupled through the bus interface unit 36 to the internal condition control unit 74. After the processor unit receives the interrupting signal, it generates a second or slave synchronization signal when its obtains the address over the DATA lines. When the peripheral unit, as the master unit, senses the slave synchronization signal, it stops transmitting the interrupting signal, the address and the signal indicating system control and thereby actively transfers system control to the processor unit 22. When the processor unit 22 senses that the peripheral unit has stopped transmitting the interrupting signal, it stops sending the slave synchronization signal and begins an interruption routine.

Therefore, the data processing system of FIG. 1 transfers information between individual units by any one of four possible operations. Each operation is controlled by a master unit which operates in conjunction with a slave unit. DATI or DATIP operations transfer information from a slave unit to a master unit; DATO operations from the master unit to the slave unit. Units other than the processor unit 22 become the master unit by means of a priority transfer operation. As described later, these priority transfers are of two general types: those requiring processor unit operation and those not requiring processor unit operation. The former are made during the "term" cycle while the latter can be made any time the processor unit 22 is not performing a bus operation. The processor unit becomes the master unit again either passively or, in the case of an interruption routine, actively.

It is now possible to describe how several of the objects of this invention are obtained. Asynchronous transfers between two units are obtained by the master and slave synchronization signals. As each signal is dependent upon operation at the master unit or slave unit, a transfer rate depends upon the master unit and slave unit that are interconnected and is the optimum rate for the pair of interconnected units. Furthermore, as any unit in the data processing system can become a master unit, any peripheral unit can control the data processing system.

As will become more apparent in the following detailed description, the selection and acknowledgement of a master unit occurs simultaneously with operations in another master unit so that the priority transfer operation does not increase system operation time significantly. One peripheral unit can become a master unit for transferring information to another peripheral unit whenever the processor unit is not performing a bus operation simultaneously with processor unit operation. Hence, direct transfers to the memory unit 24, which appears as another peripheral unit in the data processing system, do not significantly increase processor operation time.

In order to more fully appreciate how the foregoing and further objects and advantages of this invention are obtained, the following discussion describes a specific data processing system embodiment in terms of a processor unit and a typical peripheral unit in more detail. This description indicates how the various signals on the interconnecting bus are generated and utilized by the various units within the data processing system.

Detailed Description

It is necessary to describe the processor unit 22 and its operation with respect to several instructions in order to fully understand and appreciate this invention. Each instruction contains an operation code and may contain one or two operand addresses. Details of processor unit response to the operand address, which contains address mode and register selection codes, are described in the previously identified U.S. Pat. No. 3,614,741. The operation, address mode and register selection codes in an instruction are interrelated and constitute primary signals in the control unit 60 and the function of these codes are reviewed here.

Instructions

Instructions are arbitrarily divided into control, one-operand address and two-operand address categories for discussion purposes and formed as shown in Table I. When a specific instruction is transferred to the instruction decoder 64 (FIG. 2), an output signal, designated by the same mnemonic, is produced.

TABLE I — INSTRUCTIONS

| INSTRUCTION | OCTAL NUMBER | FUNCTION |
|---|---|---|
| Control Instructions | | |
| HALT | 000000 | The processor unit **22** diverts to the "term" cycle and stops operation. |
| WAIT | 000001 | The processor unit **22** relinquishes its control over the system and waits for an interrupting signal from a unit located externally with respect to the processor unit. |
| RTI | 000002 | This is the last instruction in an |

| | | |
|---|---|---|
| | | interruption routine stored in the memory unit **24**. The processor unit **24** obtains the next instruction in the interrupted program from the memory unit **24** during the next "fetch" cycle. |
| RTS | 00020R | This the last instruction in a subroutine. R is a three-bit register selection code. The processor unit **22** obtains the next instruction in the program with the JSR instruction. |
| BEQ | 001XXX | This is one of several branch instructions where XXX comprises an eight-bit offset value for modifying the PC register contents when (1) the conditon is met and bit eight is set or (2) the condition is not met and bit eight is not set. While the BEQ instruction responds to equality, other branch instructions respond to conditions such as a value being greater than, less than, greater than or equal to, less than or equal to, or not equal to a reference. Still other branch instructions sense zero, plus or minus values or other conditions. Unconditional branches are also possible. |
| One-operand Address Instructions | | |
| JMP | 0001ADR | The processor unit **22** is unconditionally transferred to another set of instructions. The address of the next instruction is stored at the location defined by the operand address ADR. |
| JSR | 004RADR | When it is necessary to obtain an intermediate result from another set of instructions and then return to the original program, the JSR instruction is issued where R is a three-bit register code. The initial subroutine instruction address is located by the operand address ADR. The address for the instruction following the JSR instruction in the original program is saved for retrieval in response to the RTS instruction. |
| CLR | 0050ADR | The location defined by the operand address ADR is set to zeroes. |
| COM | 0051ADR | The contents of the location defined by the operand address ADR are transferred to the processor unit **22** and complemented; the complemented value is returned to the addressed location. |
| INC | 0052ADR | The contents of the location defined by the operand address ADR are transferred to the processor unit **22** and incremented by a fixed value (usually by +1); and the incremented value is returned to the addressed location. |
| DEC | 0053ADR | The contents of the location defined by the operand address ADR are transferred to the processor unit **22**, decremented by a fixed value (usually by −1); and the decremented value is returned to the addressed location. |
| NEG | 0054ADR | The contents of the location defined by the operand address ADR are transferred to the processor unit **22** and converted into the two's complement form and the two's complement form is returned to the addressed location. |
| ADC | 0055ADR | The contents of the location defined by the operand address ADR are transferred to the processor unit **22** to be added to the contents of the "C" bit from the status register **59**; the sum is stored in the addressed location. The ADC instruction permits a carry from the addition of two low-order words to be utilized in a high-order result. |
| SBC | 0056ADR | The contents of the "C" bit from the status register **59** are subtracted from the contents of the location defined by the operand address ADR in the processor unit **22**. The remainder is stored in the addressed location. The SBC instruction permits the carry from the subtraction of two low-order words to be subtracted from the high-order word. |
| TST | 0057ADR | The Z and N bits in the status register **59** are set according to the contents of the addressed location. |
| ROS | 0060ADR | The contents of the addressed location are rotated one position to the right with the most significant bit and carry being replaced with the most significant carry and least significant bit, respectively. |
| | 0061ADR | The contents of the addressed location are rotated one position to the left with the most significant carry and bit being transferred to the least significant bit and most significant carry position, respectively. |
| ROS | 0062ADR | The contents of the addressed location are shifted one position to the right with the transfer of the least significant bit to the "C" bit in the status register and replication of the most significant bit. |
| | 0063ADR | The contents of the addressed location are shifted one position to the left. The most significant bit is transferred to the "C" bit in the status register; a zero is transferred to the least significant bit. |
| Two-Address Instructions | | |
| MOV | 01XADR | The contents of the location defined by the first operand address are transferred to the location defined by the second operand address without modification. XADR represents two six-bit operand addresses. |
| CMP | 02XADR | The contents of the location defined by the second operand address are subtracted from the contents of the location defined by the first operand address; the result is used to modify the information stored in the status register **59**. |
| BIT | 03XADR | The contents of the locations defined by the first and second operand addresses are combined in a logical "AND" operation; the result is used to modify the contents of the status register **59**. |
| BIC | 04XADR | Each bit in the contents defined by the first operand address is complemented and combined in a logical "AND" operation with a corresponding bit in the location defined by the second operand address. This causes each bit in the location defined by the second operand address to be cleared if the corresponding bit in the location defined by the first operand address is set. |
| BIS | 05XADR | The contents of the locations defined by the first and second operand addresses are combined in a logical "OR" operation; the result is stored in the location defined by the |

| | | |
|---|---|---|
| | | second operand address. |
| ADD | 06XADR | The contents of the locations defined by the first and second operand addresses are added; the sum is stored in the location defined by the second operand address. |
| SUB | 16XADR | The contents of the location defined by the first operand address are subtracted from the contents of the location defined by the second operand address; the remainder is stored in the location defined by the second operand address. |

Condition codes, the N, Z, V and C bits in the status register 59 (FIG. 2), are modified appropriately after each instruction is executed.

Operand Addresses

If the instruction contains a single operand address in bits φ through 5, the data to be operated upon is obtained from and returned to the location defined by the operand address. With two-operand addresses, the first operand address, comprising bits 6 through 11, usually defines the location from which data is obtained. The second operand address, comprising bits φ through 5, usually defines the location to which the data is to be transferred after modification in accordance with the operation code. As described with reference to the instructions, data may be obtained from locations defined by both operand addresses and these operand addresses may define locations which are in the processor unit 22, the memory 24 or any of the peripheral units.

Figure 7A:
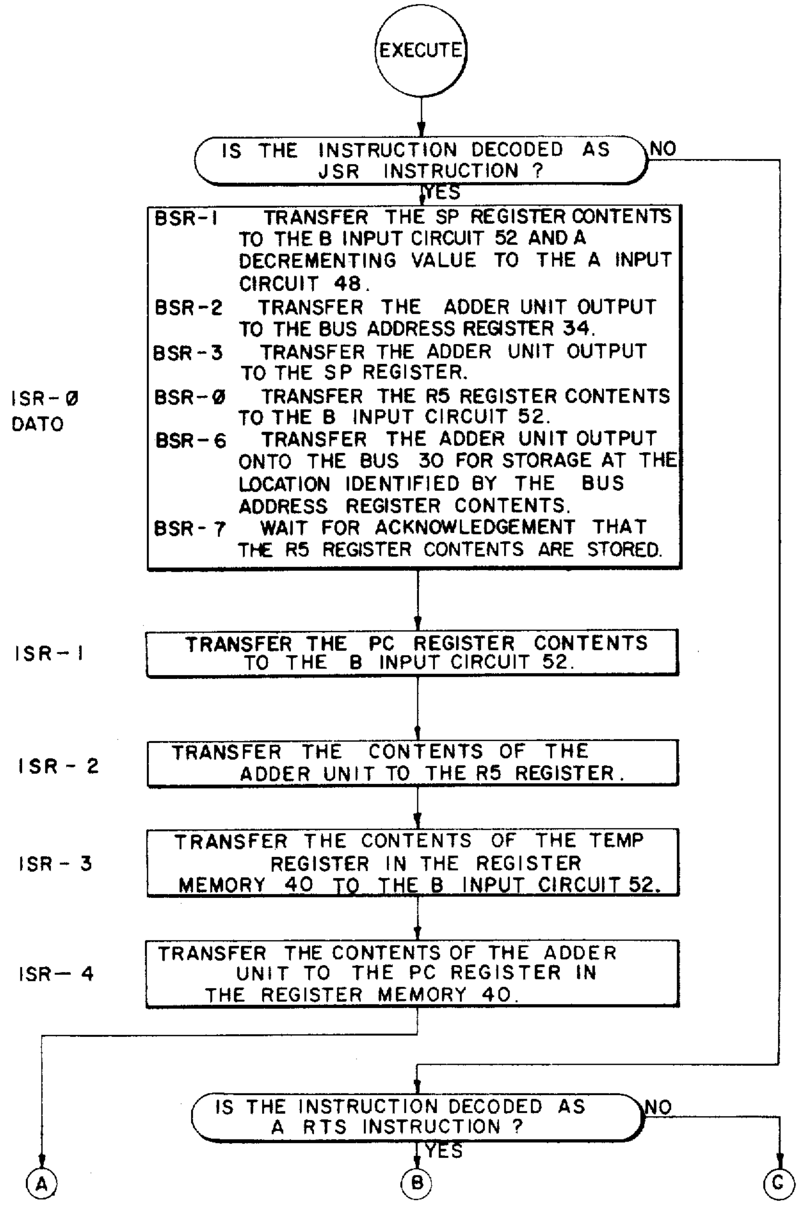
FIG. 7 is a flow diagram of an "execute" cycle produced by the processor unit of FIG. 2.
Figure 7B:
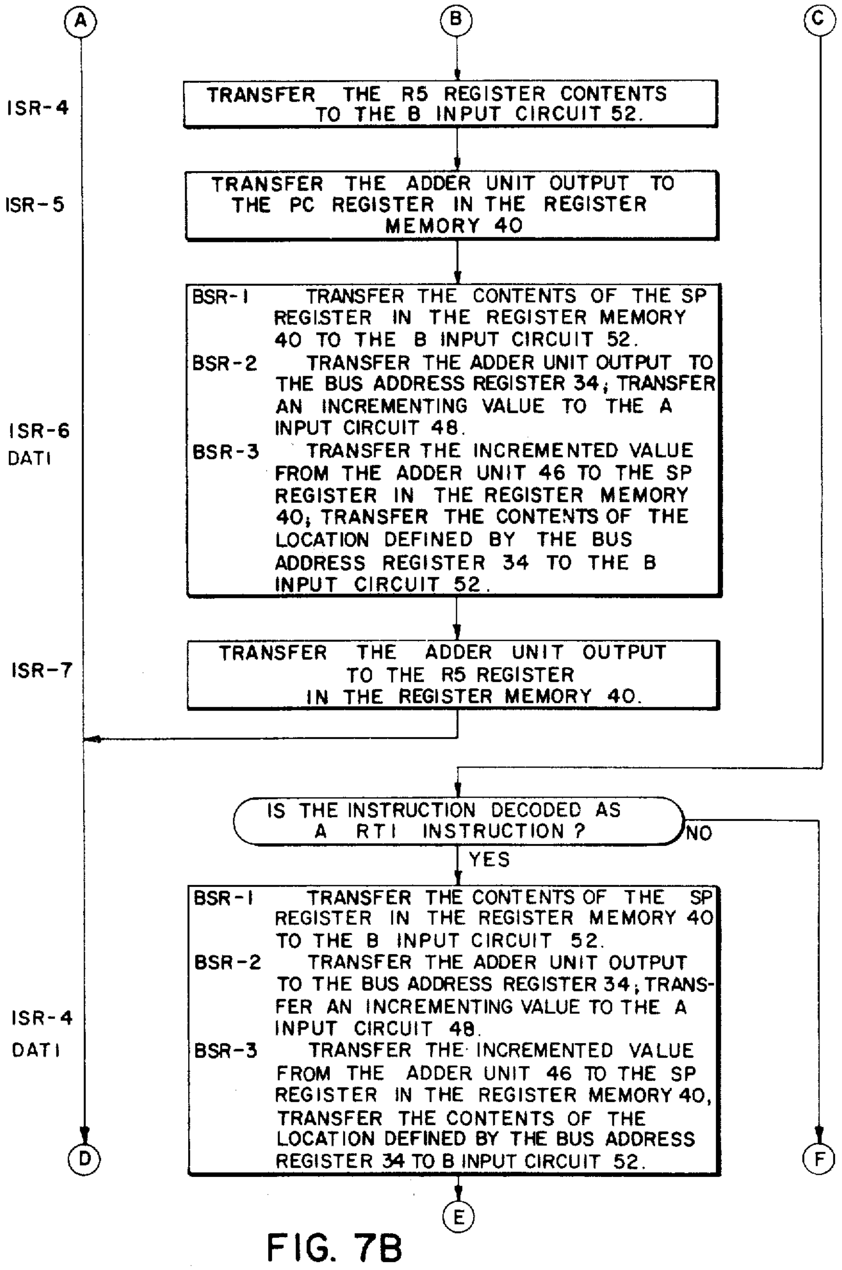
Figure 7C:
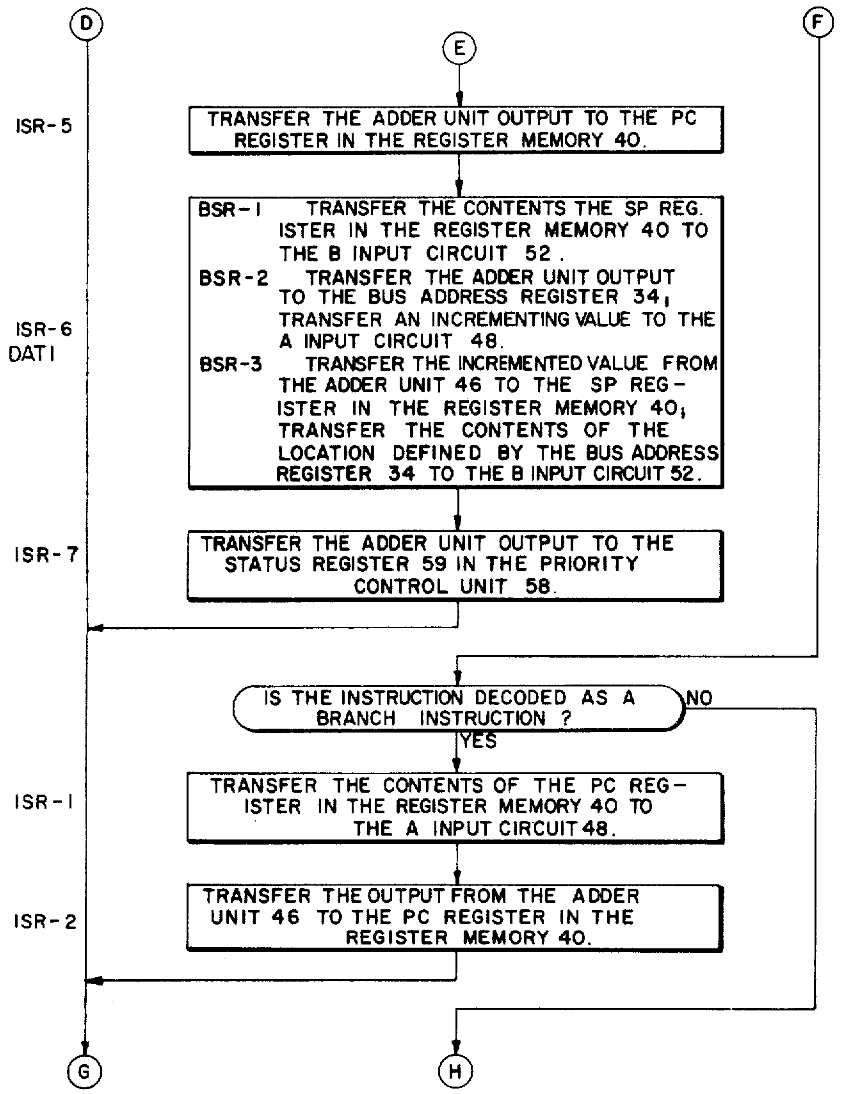
Figure 7D:
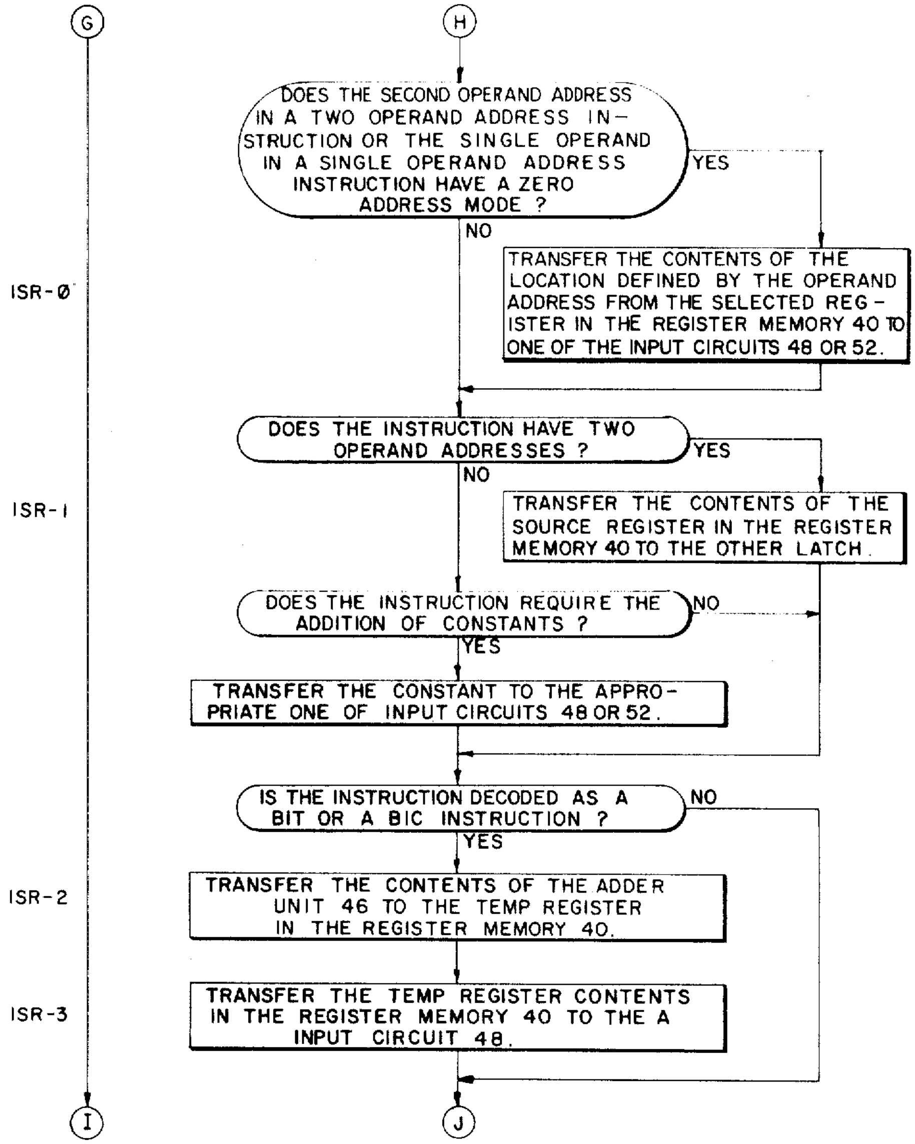
Figure 7E:
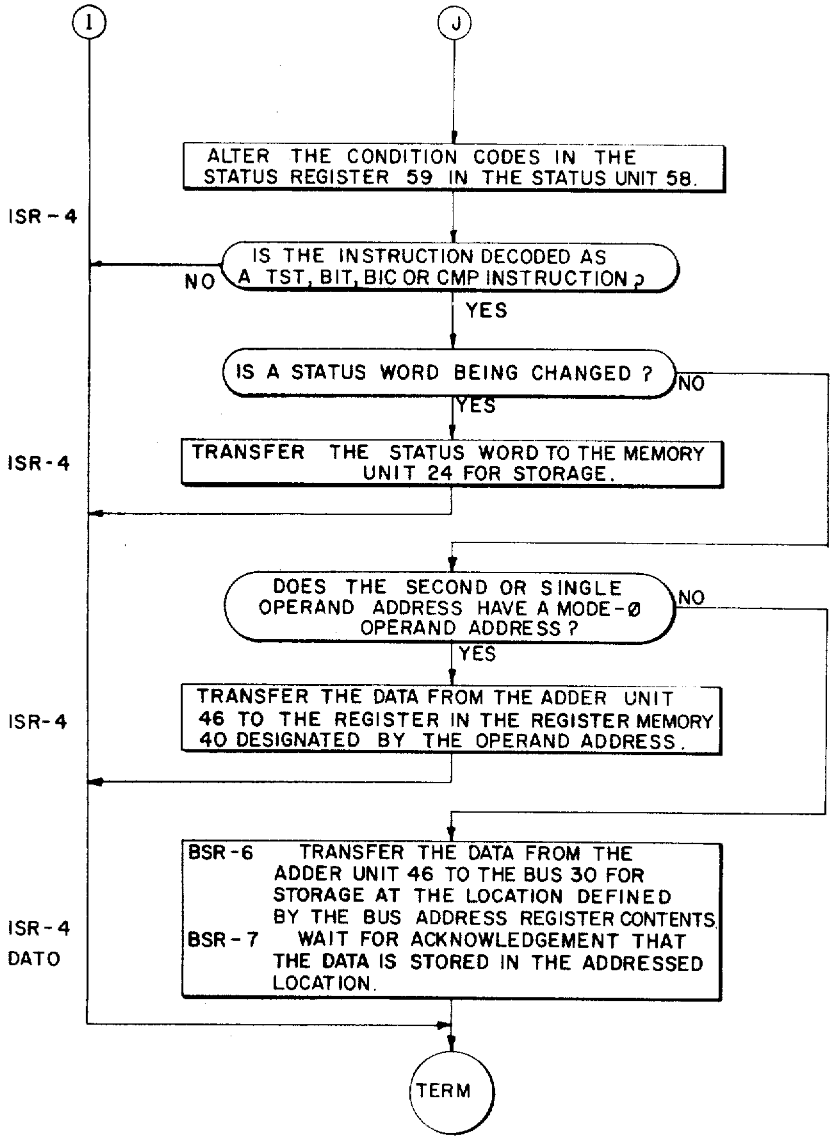
Figure 8A:
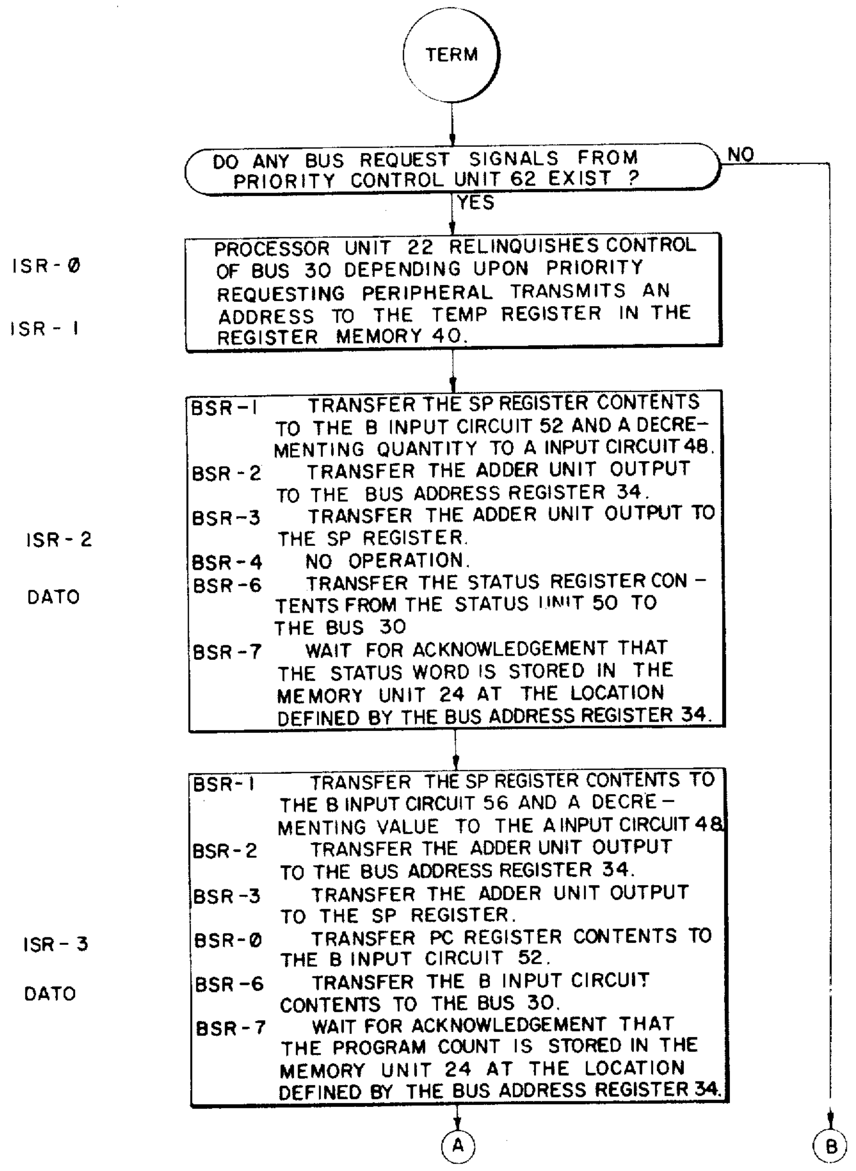
FIG. 8 is a flow diagram of "term" cycle produced by the processor unit of FIG. 2.

System response to each operand address mode, described with reference to the flow diagrams for the processor unit "fetch," "execute" and "term" operating cycles in FIGS. 6, 7 and 8 is shown in Table II.

TABLE II

| Address Modes | Function |
|---|---|
| 0 and 1 | The selected register in the register memory **40** contains data if MODE-0 and a data address if MODE-1. |
| 2 and 3 | The selected register contains a data address if MODE-2 and the address of an intermediate location containing data if MODE-3. The register contents are incremented after they are used. |
| 4 and 5 | The selected register contents are initially decremented. The decremented contents constitute a data address if MODE-4 and the address of an intermediate location containing a data address if MODE-5. |
| 6 and 7 | The contents of the next instruction location are retrieved as the index value and added to the selected register contents. The sum is a data address if MODE-6 and the address of an intermediate location containing a data address if MODE-7. |

Processor Unit Operation

With this general understanding of the significance of the address modes and register selection bits, it is possible to discuss various operation cycles produced by the processor unit 22 in response to various instructions in detail to show when the processor unit produces DATI and DATO bus operations.

"Fetch" Cycle

FIG. 6 is a flow diagram for the "fetch" cycle which obtains an instruction from the memory unit 24 (FIG. 1) and transfers the data defined by the operand address, if any, to the processor unit 22. Each cycle is characterized by a timing signal identified by a mnemonic ISR and BSR and generated by circuitry described with reference to FIG. 9. ISR signals are used for internal processor unit timing while BSR signals are used for timing and controlling bus operations.

Figure 6A:
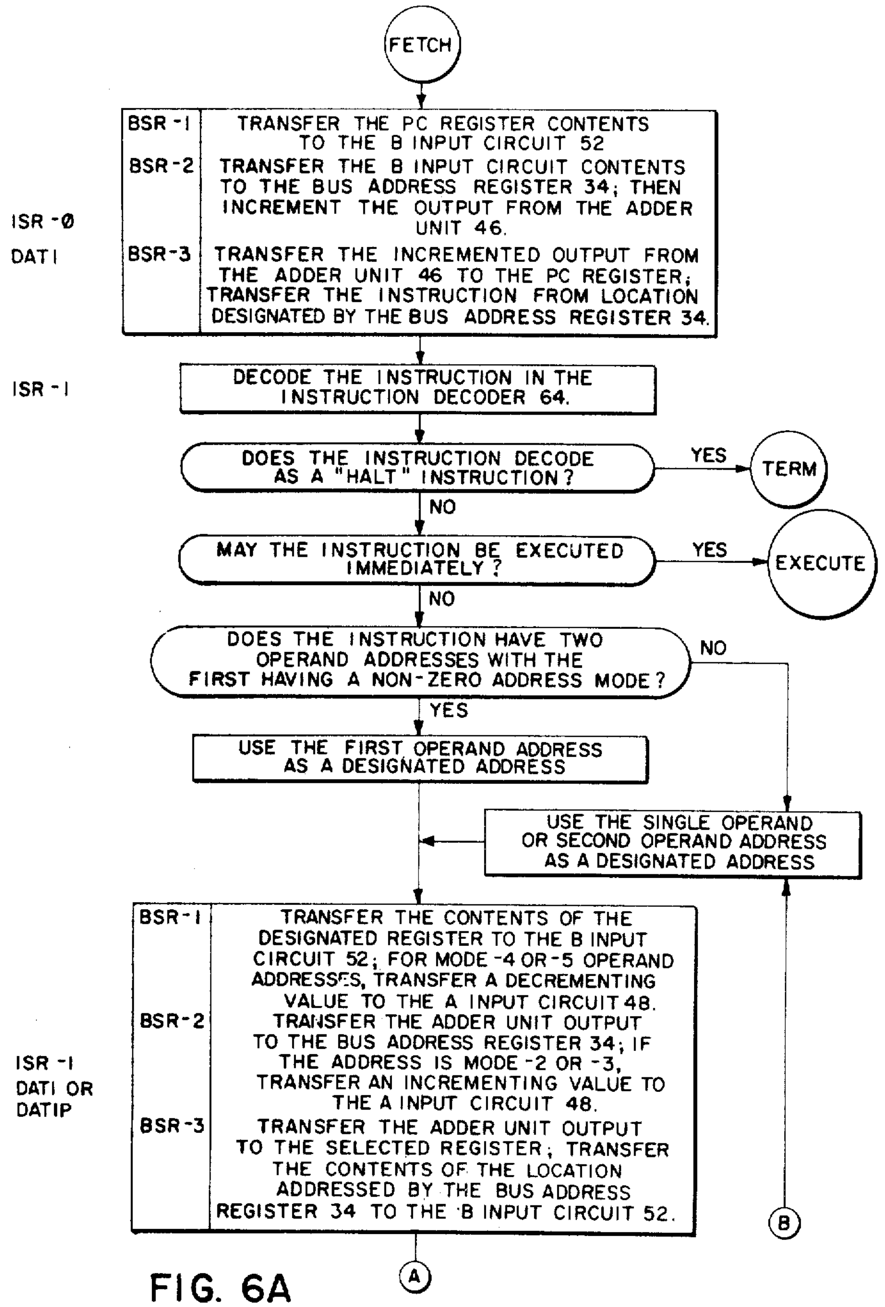
FIG. 6 is a flow diagram of "fetch" cycle executed by the processor unit of FIG. 2.

When the processor unit 22 (FIG. 2) begins a "fetch" cycle, an extended ISR–φ state is used to enable the processor unit to perform a DATI bus operation comprising three BSR states generated by the control unit 60 and shown in FIG. 6A. The contents of the PC register are transferred to the B input circuit 52 during a BSR–1 state. Unless specified otherwise, an unused input circuit produces a zero output. With the A input circuit 48 producing a zero output, the program count passes through the adder unit 46 without modification to the bus address register 34 during a first portion of the BSR–2 state. An incrementing value applied to the A input circuit 48 produces a new program count at the output of the adder unit 46 during a second portion of the BSR–2 state. After this new program count is moved to the PC register in the register memory 40 during a first portion of the BSR–3 state, the instruction stored at the location addressed by the bus address register 34 is transferred into the instruction register 62 during a second portion of the BSR–3 state.

When this DATI bus operation is completed, the timing unit 66 and general control unit 68 produce an ISR–1 state for decoding the instruction in the instruction decoder 64 and for making several decisions. If the instruction is decoded as a RTI or RTS instruction, a single operand address instruction with a MODE–φ operand address, or a branch instruction with the conditions met, it can be executed immediately so the processor unit 22 diverts to the "execute" cycle shown in FIG. 7. The processor unit 22 diverts to the "term" cycle of FIG. 8 in response to a HALT or WAIT instruction, a branch instruction where the conditions are not met or other similar instructions.

If the processor unit 22 is not diverted to either the "execute" or "term" cycles, the necessary steps to obtain the information defined by the operand address or addresses are taken. If the first of two operand addresses in the instruction is not a MODE–φ operand address, it is selected as a designated address. Otherwise, the second or single operand address becomes the designated address.

After the proper operand address has been designated, the control unit 60 utilizes a DATI or DATIP bus operation during an extended ISR–1 state comprising three BSR states to initially decode the operand address. The contents of the register identified in the designated operand address are moved to the B input circuit 52 during the BSR–1 state. A decrementing quantity is coupled to the A input circuit 48 to decrement the value applied to the B input circuit 52 if the designated operand address is a MODE–4 or –5 operand address. In any case, the output from the adder unit 46 is transferred to the bus address register 34 during the BSR–2 state. If the designated operand address is a MODE–2 or –3 operand address, an incrementing quantity is applied to the A input circuit 48 during a second portion of the BSR–2 state. After the output from the adder unit 46 is returned to the register defined in the designated operand address during a first portion of the BSR–3 state, the contents of the location addressed by the bus address register 34 are transferred to the B input circuit 52. The BSR-3 state is extended until this transfer has been completed.

Figure 6B:
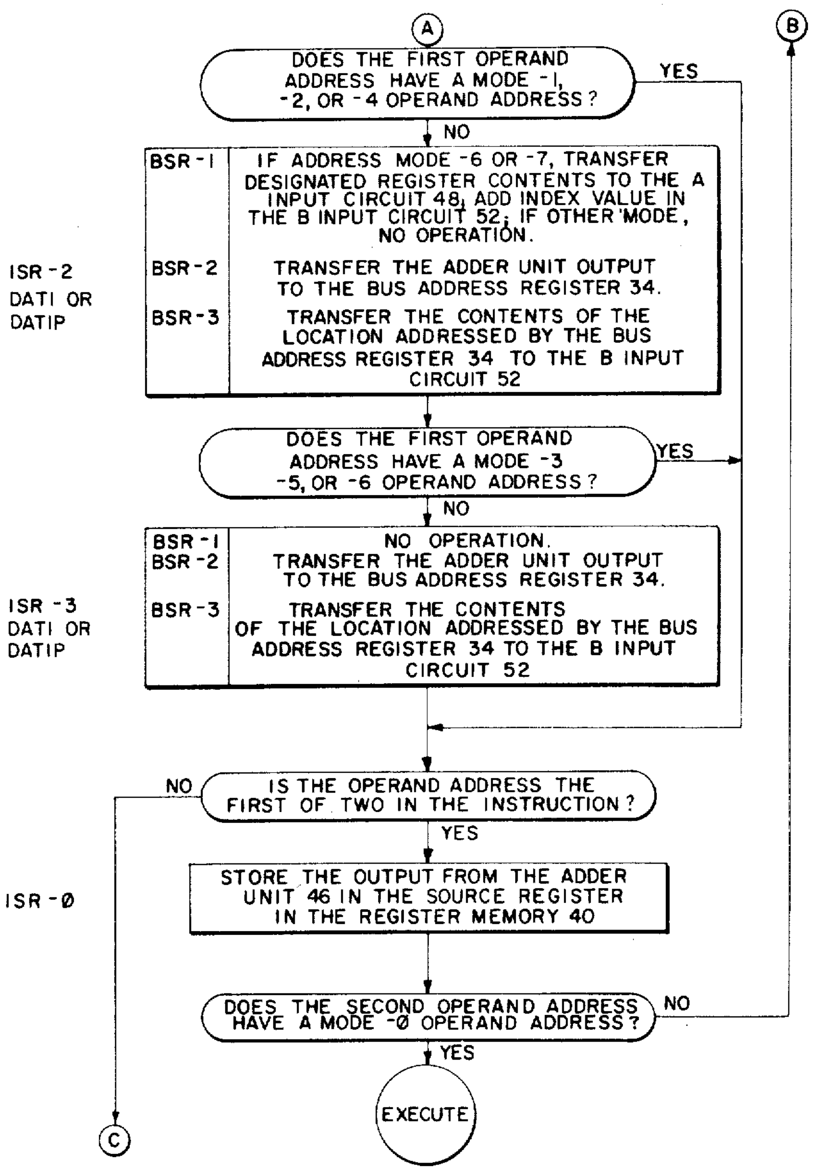

Referring to FIG. 6B, with MODE-1, -2 or -4 operand addresses, the B input circuit 52 contains data and no further operations are necessary. With MODE-3, -5, -6 or -7 operand addresses, the B input circuit 52 contains an address, and the processor unit 22 performs another DATI or DATIP bus operation during an ISR-2 state which includes three BSR states. No operation occurs in the BSR-1 state unless the operand address is a MODE-6 or -7 operand address. Either mode causes the PC register to be implicity selected and its contents incremented during the ISR-1 state so that the B input circuit contains an index value at the end of the ISR-1 state. During the ISR-2 state, the contents of the register identified in the operand address are moved to the A input circuit 48 for addition to the index value. After the output from the adder unit 46 is transferred to the bus address register 34 during the BSR-2 state, an extended BSR-3 state is used to move the contents of the location addressed by the bus address register 34 to the B input circuit 52.

When the ISR-2 state terminates, the B input circuit 52 contains data if the operand address is a MODE-3, -5, or -6 operand address. No additional addressing operations are necessary. With a MODE-7 operand address, the B input circuit contains a data address; and another DATI or DATIP operation is performed during an ISR-3 state. No operations occur during the BSR-1 state. The data address is transferred directly to the bus address register 34 during the BSR-2 state. An extended BSR-3 state moves the data to the B input circuit 52. Upon the termination of the ISR-3 state, all addressing related to the designated operand address has been completed.

Once an operand address has been decoded, the B input circuit contents are transferred through the adder unit 46 to a SOURCE register in the register memory 40 if the designated operand address is a first of two operand addresses. Once this transfer is made, the remaining operand address is decoded by repeating the preceding DATI or DATIP bus operations during ISR-1, -2, and -3 states if it is not a MODE-ϕ operand address. If it is a MODE-ϕ operand address, the processor unit 22 diverts to the "execute" cycle. In all other cases, the processor unit 22 terminates the "fetch" cycle with some preliminary transfers if the instruction is a JMP or JSR instruction.

Figure 6C:
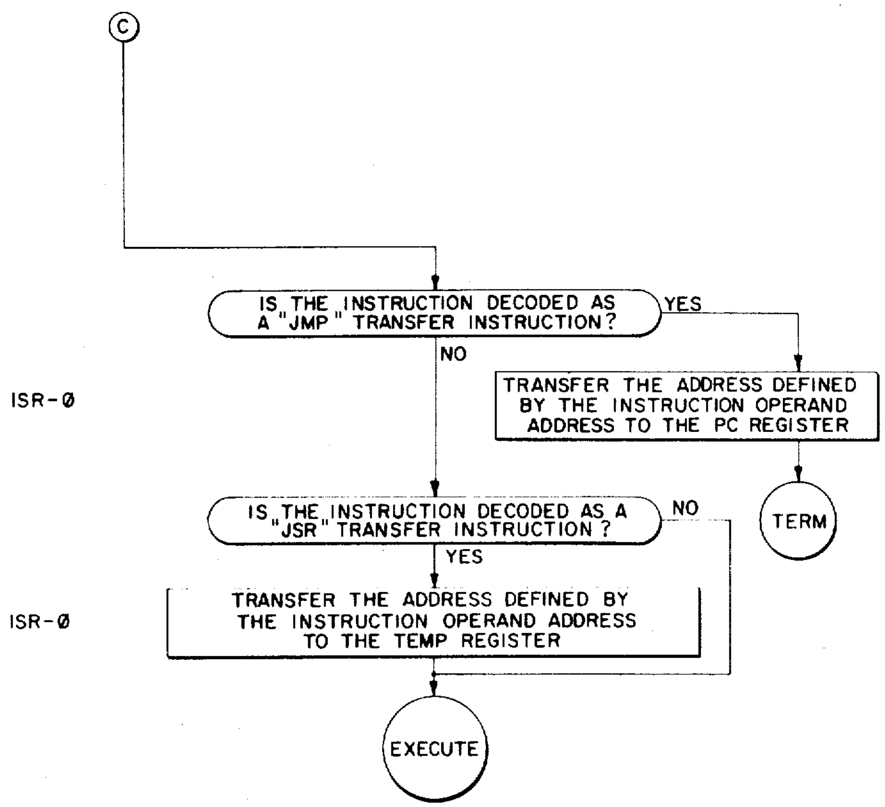

Referring to FIG. 6C, both the JMP and JSR instructions modify the "fetch" cycle response to their operand addresses. When the last ISR state required to decode the operand address is started, the control unit 60 modifies the BSR-3 state to omit the transfer of the addressed contents to the B input circuit 52. This modification occurs because the outpt from the adder unit 46 is the address for the first instruction to be used after the JMP or JSR instruction has been completed. With a JMP instruction, the instruction address is moved to the PC register during a ISR-ϕ state. Then the processor unit 22 diverts to the "term" cycle. With a JSR transfer instruction, the initial subroutine instruction address is stored temporarily in the TEMP register during an ISR-ϕ state. The processor unit 22 then diverts to the "execute" cycle of FIG. 6 as it also does if the instruction is neither a JMP nor JSR instruction.

"Execute" Cycle

The response of the processor unit 22 during the "execute" cycle is determined by the instruction. Therefore, processor unit operation varies for each instruction as described with reference to FIG. 7.

JSR INSTRUCTION

Referring to FIG. 7A, the control unit 60 initially produces a DATO operation during an extended ISR-ϕ state in response to a JSR instruction and transfers the contents of the SP register (the R6 register) in the register memory 40 to the B input circuit 52. A decrementing value is applied to the A input circuit 48 simultaneously during the BSR-1 state. The decremented value from the adder unit 46 is moved to the bus address register 34 and to the SP register in the register memory 40 during the BSR-2 and BSR-3 states respectively. When the BSR-3 state is finished, the bus address register 34 addresses a vacant location in the group of contiguous locations defined as block 94 in FIG. 3. During the following BSR-ϕ and -6 states, the contents of the register identified by bits 6, 7 and 8 in the instruction are transferred through the B input circuit 52 to the vacant location. As previously indicated, any register in the register memory 40 could be identified by the JSR instruction. During the BSR-7 state, the processor unit 22 waits until the R5 register contents have actually been stored and then terminates both the BSR-7 and ISR-ϕ states. Hence, the R5 register contents are transferred into the memory unit 24 during the DATO bus operation by decrementing the SP register contents to define a vacant address in the block 94.

During the following ISR states, no bus operations occur. The PC register contents are transferred to the B input circuit 52 and then to the R5 register during an ISR-1 and ISR-2 state. The address for the first subroutine instruction is transferred from the TEMP register, where it was stored during the "fetch" cycle, to the B input circuit 52 during the ISR-3 state. This new program count is then moved to the PC register during the ISR-4 state. When the ISR-4 state is finished, the PC register contains the address for the first instruction in the subroutine; the R5 register, the address for the next instruction in the operating routine and the last entry to the block 94 comprises the contents of the R5 register which existed during the "fetch" cycle. This completes the operations required by the JSR instruction so the processor unit 22 completes the "term" cycle. During the next "fetch" cycle, the first instruction in the subroutine is obtained from the block 90 in the memory unit 24 of FIG. 3.

RTS INSTRUCTION

Each subroutine terminates with an RTS instruction identifying the same register as its related JSR instruction. When the R5 register is always designated in the JSR instructions, the RTS instruction has a fixed format. Therefore, a programmer always uses the same instruction as the last instruction in a subroutine. Referring to FIGS. 7A and 7B, the ISR-4 and ISR-5 states generated by the control unit 60 transfer the R5 register contents through the B input circuit 52 to the PC register. During an extended ISR-6 state, which constitutes a DATI operation, and following ISR-7 state, the processor unit 22 moves the last entry in the block 94 (FIG. 10) to the R5 register.

More specifically, during the BSR-1 state, the SP register contents are transferred to the B input circuit 52. As the SP register is decremented before transferring data to the block 94 in the memory unit 24, the SP register contains the address for the last entry. This address is transferred to the bus address register 34 during a first portion of the BSR-2 state. An incrementing value, applied to the A input circuit 48 during a second portion of the BSR-2 state, returns the incremented address to the SP register during the BSR-3 state. At the end of the BSR-3 state, the B input circuit 52 contains the last entry from the block 94 obtained by a DATO operation. This entry is transferred to the R5 register during the ISR-7 state. When the ISR-7 state is finished, the PC register contains the address of the operating routine instruction following the JSR instruction. The R5 register contains the last entry from the block 94; and the SP register, the address of the next filled location in the block 94. During the next "fetch" cycle, the instruction in the operating routine which follows the JSR instruction is obtained from one of the blocks 86, 90 or 92 in the memory unit 24 shown in FIG. 10.

RTI INSTRUCTION

Whenever the processor unit 22 relinquishes its control over the data processing system after a peripheral request to interrupt the operating routine is granted, the program count and status word for the interrupted operating routine are moved to the next two available memory locations in the block 94 (FIG. 3) by DATO operations. Then the status word and program count for the interruption routine are moved to the status register 59 and the PC register respectively.

All interruption routines terminate with the same RTI instruction. When the instruction is decoded, the processor unit 22 uses ISR-4, -5, -6 and -7 states to transfer the interrupted operating routine program count and status word to the PC register and status register 59. Referring to FIGS. 7B and 7C, a DATI operation is used in an extended ISR-4 state comprising BSR-1, -2 and -3 states to obtain the operating routine program count from a location in the memory unit 24 defined by the SP register. After the SP register contents are moved to the bus address register 34 during the BSR-1 and BSR-2 states, an incrementing value, applied to the A input circuit 48, produces an incremented value for return to the SP register during the BSR-3 state. A DATI operation during this state transfers the last entry in the block 94 (the program count) to the B input circuit 52 for transfer to the PC register during the ISR-5 state. Another DATI operation during an extended ISR-6 state with three BSR states which similarly increment the SP register contents, transfers the status word to the status register 59 during the ISR-7 state. After these operations are finished, the processor unit 22 diverts to the "term" cycle.

BRANCH INSTRUCTION

When a branch instruction is decoded, the offset value in bits φ through 7 is stored in the B input circuit 52 during the "fetch" cycle. During the "execute" cycle shown in FIG. 7C, the processor unit moves the PC register contents to the A input circuit 48 during the ISR-1 state. A new program count, constituted by the incremented program count and offset sum from the adder unit 46, is transferred to the PC register during an ISR-2 state. When the processor unit generates the next "fetch" cycle, the instruction at the new location is obtained. Processor unit response to a Branch instruction illustrates an operating cycle without any bus operations.

OPERAND ADDRESS INSTRUCTIONS

If the instruction is not decoded as a JSR, RTS, RTI or Branch instruction, it is executed by transferring data to the A or B input circuits 48 or 52. If the second of two or a single operand address is a MODE-φ operand address, the contents of the register defined by the operand address are transferred to one of the input circuits 48 or 52 as shown in FIG. 6D.

The selected input circuit depends upon the instruction and the address mode. For example, data defined by a MODE-φ operand address as the second operand address in the instruction is transferred to the B input circuit 52 by an ADD instruction. Data defined by a MODE-φ operand address in a NEG instruction is transferred to the A input circuit 48.

Referring again to FIG. 7D, the processor unit moves the SOURCE register contents (i.e., the data identified by the first operand address) to one of the input circuits. Data retrieved in response to single operand address instructions is transferred directly to an input circuit. Constants are then moved to the other input circuit, if required. For example, data in the B input circuit 52 is modified by loading the A input circuit 48 with the incrementing or decrementing value for INC or DEC instructions.

If the instruction is a BIT or BIC instruction, extra operations are required to obtain the logical AND result. A logical OR combination is performed first with the complements of the data identified by the operand addresses and then the result is complemented to obtain the logical AND result. Specifically, the adder unit output contains the result of the OR operation. This result is moved through the TEMP register to the complementing input of the A input circuit 48 during ISR-2 and ISR-3 states as shown in FIG. 7D to provide the final AND result.

An ISR-4 state is used to modify the condition codes, the N,V,C and Z bits in a status word, as required, after the various instructions have been performed. If the instruction is a TST, BIT, BIC or CMP instruction, the necessary information is transferred to the status register 59. If the instruction is one which changes a status word, the processor unit uses an ISR-4 timing state to store the new status word in the memory unit.

If a status word is not to be changed and the second of two operand addresses or the single operand address is a MODE-φ operand address, the output from the adder unit 46 is transferred to the designated register. For other modes, the adder unit output is moved according to the bus address register contents. Therefore, BSR-6 and BSR-7 states move data onto the bus 30 with a DATO operation. When the slave synchronization signal acknowledges storage, the processor unit begins a "term" cycle.

Therefore, the processor unit 22 in FIG. 2 performs certain functions during an "execute" cycle which are dependent upon the specific instruction. The resulting timing states and bus operations for transferring instructions and data are provided by the control unit 60 and circuitry more specifically described with reference to FIGS. 9 through 13.

"Term" Cycle

The third operating cycle and related bus operations for the processor unit 22 is a "term" cycle diagrammed in FIG. 8. If the priority unit 58 produces a bus request signal as described with reference to FIG. 12, the control unit 60 enters an ISR-$\phi$ state.

In a data processing system organized as shown in FIG. 1, the processor unit 22 relinquishes control of the system to the peripheral unit. Once this control has passed to the peripheral unit, a previously stored address is transmitted from the peripheral unit into the TEMP register in the register memory 40 through the B input circuit 52. This address serves as an "interruption vector" to identify the storage locations in in the memory unit for the interruption routine address and status word. After this transfer to the B input circuit is completed, the processor unit 22 regains control of the system and to produce DATO and DATI operations.

The ISR-2 state comprises six BSR states which include a DATO operation. When the control unit 60 produces the BSR-1 state, the SP register contents are moved to the A input circuit 48. During the BSR-2 state, the decremented value from the adder unit 46 is transferred to the bus address register 34 to identify the next available location in the block 94 (FIG. 3). The decremented value is also returned to the SP register during a BSR-3 state. After an inactive, intermediate BSR-4 state, the control unit 60 moves an eight-bit status word from the status register 59 to the memory unit 24 by a DATO operation for storage in the block 94 at the location defined by the bus address register 34. An extended BSR-7 state stops processor unit operation until the DATO operation is completed.

Now the control unit 60 produces another DATO operation during an ISR-3 state which also comprises six BSR states to transfer the PC register contents to the memory unit 24. More specifically, the SP register contents are decremented in the arithmetic unit 44 during a BSR-1 state, transferred to the bus address register 34 during a BSR-2 state and returned to the SP register during a BSR-3 state. An intermediate BSR-$\phi$ state, provided to transfer the PC register contents to the B input circuit 52, is followed by a BSR-6 state which moves the program count onto the bus 30 with a DATO operation terminating during an extended BSR-7 state for storage in the memory unit 24 at the next vacant location in the block 94 (FIG. 3). When the ISR-3 state is finished, the status word and program count for the interrupted operation routine are stored in contiguous memory locations.

Figure 8B:
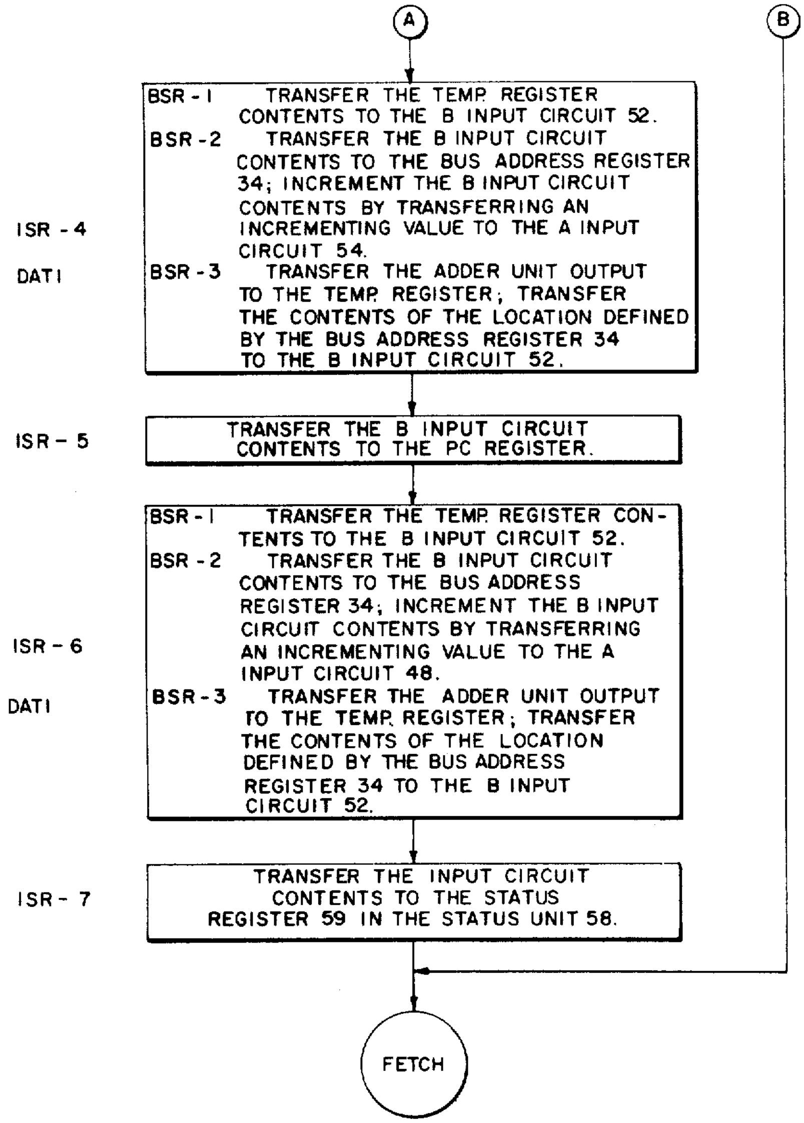

A DATI operation during an ISR-4 state comprising three BSR states moves the interruption vector from the TEMP register to the B input circuit 52 during a BSR-1 state as shown in FIG. 8B. During a first portion of the BSR-2 state, the interruption vector is moved to the bus address register 34 and then incremented during a second portion of the BSR-2 state. The control unit 60 utilizes a BSR-3 state to return the incremented interruption vector to the TEMP register. Then the DATI operation transfers the contents of the location defined by the bus address register 34 to the B input circuit 52. Therefore, the B input unit 52 stores the address for the first instruction in the interruption routine. This address is transferred to the PC register when the control unit 60 produces an ISR-5 state.

The incremented interruption vector in the TEMP register is the address for the status word associated with the interruption routine. A new status word must be provided because the interruption routine usually has different priority and condition codes from those of the operating routine.

Another DATI operation during an ISR-6 state comprising three BSR states is used to transfer this incremented interruption vector to the B input circuit 52 and to the bus address register 34 during the BSR-1 and BSR-2 states. The BSR-2 state is also used to increment the B input circuit contents for return to the TEMP register during the BSR-3 state. Then a DATI operation moves the new status word to the B input circuit 52. It is transferred to the status register 59 through the arithmetic unit 44 during an ISR-7 state.

After the ISR-7 state is finished, the processor unit 22 has completed the "term" cycle and returns to the "fetch" cycle. The next instruction obtained in response to the PC register contents and transferred to the processor unit 22 is the first instruction in the interruption routine. If no interruptions occur, none of these steps occur; and the processor unit produces a "fetch" cycle to obtain the next operating routine instruction after the "execute" cycle.

Timing Unit

As discussed with reference to FIGS. 6, 7 and 8, each operation in the processor unit 22 is defined and controlled by an ISR or BSR time state signal generated by the timing unit 66 in FIG. 2. Each timing state depends upon several factors including the previous timing state, the instruction and conditions in the processor unit 22. A detailed understanding of how each timing state is produced is not necessary to appreciate this invention. However, the circuitry and timing signals shown in FIGS. 9A and 9B in conjunction with the flow diagrams of FIGS. 6, 7 and 8 enable a more thorough understanding and will permit a person of ordinary skill in the art to produce the specific control circuitry necessary to provide the described processor unit operation.

Figure 9A:
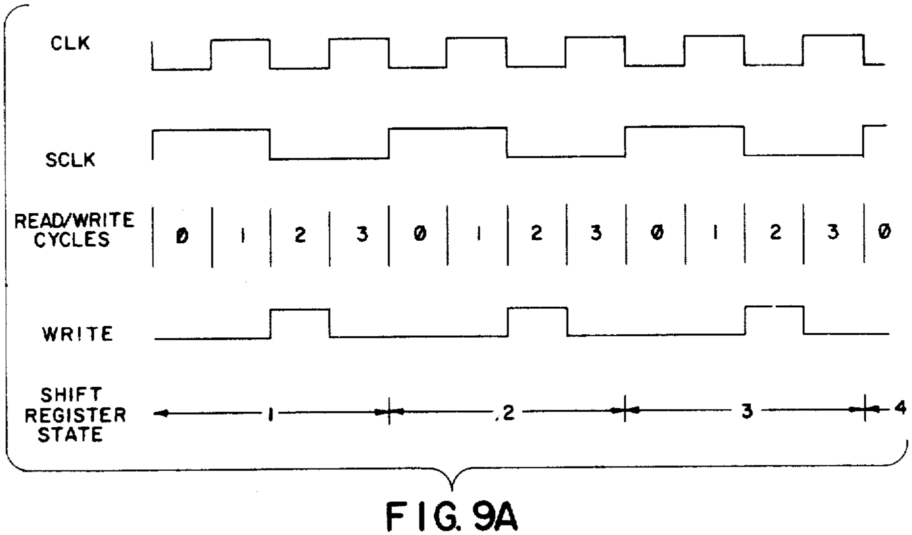
FIG. 9 depicts a timing unit for the processor unit of FIG. 2.
Figure 9B:
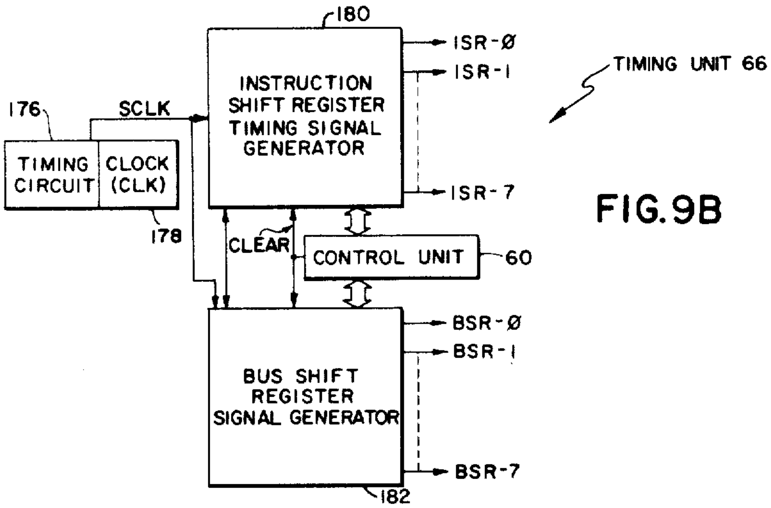

Referring to FIG. 9B, the timing unit 66 comprises a timing circuit 176, a clock 178 and two signal generators 180 and 182. FIG. 9A shows the relationship of the CLK signals from the clock 178 and the SCLK signals from the timing circuit 176. Each change in the CLK signals defines a read or write cycle boundary with a specific read or write cycle being determined by the relationship of the SCLK and CLK signals. As shown in FIG. 9A, such read/write cycles R/W-0, R/W-1, R/W-2 and R/W-3 are generated during each SCLK cycle from the timing circuit 176. The R/W-2 cycle is always a write cycle while the clock 178 may be stopped during an R/W-3 cycle to extend a BSR state during a bus operation. Each group of four R/W cycles together with other signals from the control unit 60 defines a shift register state represented by a signal on one of the output conductors from one of the generators 180 or 182.

More specifically, the SCLK signals from the timing circuit 176 and signals from the control unit 60 are applied to the instruction shift register signal generator 180 and the bus shift register signal generator 182. The generator 180 produces ISR signals while the generator 182 produces BSR signals. A CLEAR signal applied to one of the generators produces a "zero" state. Otherwise, each generator normally sequences from one state to another with specific sequences necessary to operate the processor unit 22 being shown in FIGS. 6, 7 and 8. These FIGURES illustrate how each timing state depends upon prior conditions and when the sequence may be modified.

Status Unit

Figure 10:
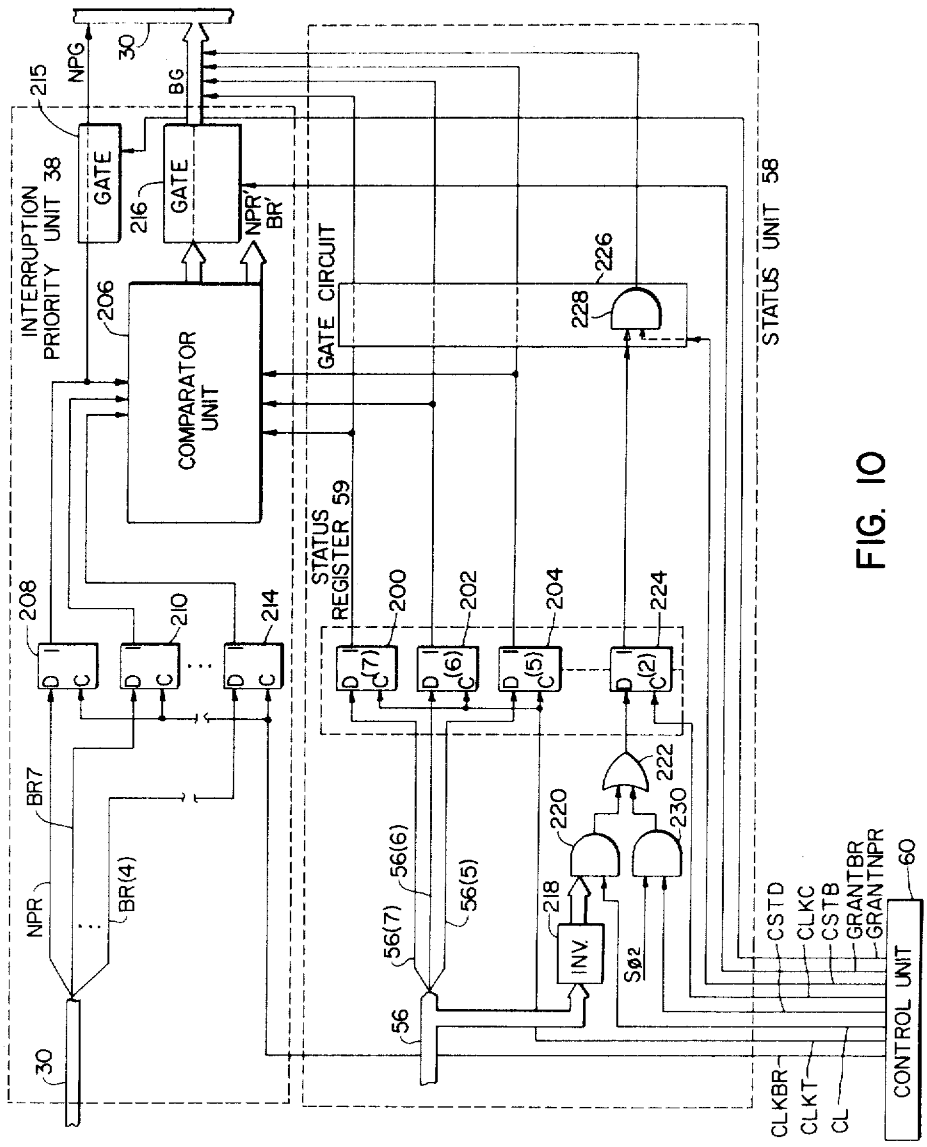
FIG. 10 is a schematic of a status unit and interruption priority unit for the processor unit shown in FIG. 2.

FIG. 10 illustrates one embodiment of the interruption priority unit 38 and the status unit 58 including the status register 59 in the processor unit 22 of FIG. 2.

Processor unit priority is altered by signals on wires 56(5), 56(6) and 56(7) when a status word is on the bus 56. These three signals are stored in clocked flip-flops 200, 202 and 204 by a CLKT pulse. The CLKT pulse is generated when the status register 59 is implicitly addressed during the ISR–7 state of an RTI instruction "execute" cycle or of a "term" cycle or during the ISR–4 state of an "execute" cycle when an instruction operand address explicitly identifies the status register and the processor is ready to transfer to the "term" cycle. Each CLKT pulse occurs as the timing unit changes from the previous ISR state. Hence, the clocked flip-flops 200, 202 and 204 define one of eight processor unit priorities for a comparator circuit 206 which also responds to signals from flip-flops 208, 210 and 214.

Figure 5:
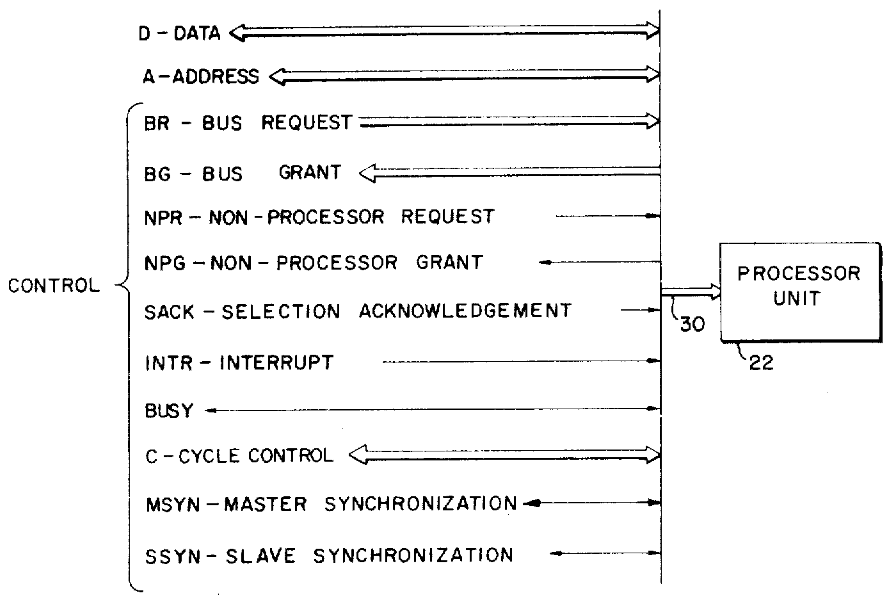
FIG. 5 illustrates signals which are transferred over the bus shown in FIG. 1.

In a data processing system as shown in FIG. 1, a peripheral unit can gain control of the system and transmit information onto or from the bus 30 under its own control for transfer to or from a peripheral unit or the processor unit 22. When the peripheral unit is transferring data to or from a peripheral unit independently of processor unit operation, it makes a Non-Processor Request by generating an NPR signal. Bus Requests are made by a BR signal. When an NPR or BR signal exists, one or more of the flip-flops 208, 210 or 214 are set by periodic CLKBR pulses described later. NPR signals have the highest priority and disable the comparator circuit 206. They can be granted whenever the bus 30 is not being used to transfer information. When this condition exists, a GRANTNPR pulse is generated, usually at the termination of a bus cycle, to a gate 215 to transfer a NPG signal onto the NPG wire in the bus 30 (FIG. 5).

When a BR signal has sufficient priority, a signal from the comparator 206 is coupled through a gate 216 as a Bus Grant (BG) pulse in response to GRANTBR pulse from the control unit 60. The GRANTBR pulse is generated only during a "term" cycle ISR–φ state when the flip-flop 208 is reset indicating that no NPR requests exist. Signals from the flip-flop 208 and the comparator 206 also produce NPR' and BR' signals which indicate that the processor unit is ready to give up system control. Processor unit and peripheral unit response to these and other signals are described later.

The C, V, Z and N condition codes appear on wires 56(φ) through 56(3) when the bus 56 contains a status word. As the circuitry for the Z bit is exemplary, it is shown in FIG. 10. The Z bit is set if the data on the bus 56 is zero after an instruction has been executed. All the data is coupled through inverters represented by an inverter 218 to energize an AND circuit 220 in conjunction with a normally enabling CL signal. A clocked flip-flop 224 is set or reset during the next CLKC pulse. Internal processor conditions for generating the CLKC pulse are identical to those for the CLKT pulse. The CLKC pulse is also produced during an "execute" cycle ISR-4 state for certain instructions requiring condition codes modification. Another flip-flop for the C bit, analogous to the flip-flop 224, may be additionally clocked for still other instructions.

When it is desired to transfer the status word onto the bus 30, a CSTB signal enables a gate circuit 226, including an AND circuit 228 for the Z bit. The CSTB signal is generated during the BSR–6 and BSR–7 states of a "term" cycle ISR–2 state when the status register contents are transferred to the memory unit from the status register 59 in response to an instruction which explicitly or implicitly addresses the status register 59.

Condition codes or a specific code are transferred into the condition code flip-flops, like the flip-flop 224, by a CSTD signal. This signal enables an AND circuit 230 to set or reset the flip-flop 224 in accordance with the output from the adder unit 46 (FIG. 2), specifically the S $\phi_2$ signal. The CSTD signal is generated under the same conditions as the CLKT pulse, but it exists for an entire ISR state.

Therefore, the status register 59 comprises eight clocked flip-flops and associated gating circuits which are enabled by one of several, mutually exclusive pulses produced by the control circuit 60. One set of flip-flops stores priority information; the other, condition codes. Each group can be set independently or together with the priority flip-flops usually being set only when a priority change is required as when an interruption routine is initiated.

Processor Unit Transfers

To fully understand the interaction between a peripheral unit, processor unit and memory unit, consider a data processing system including an analog-to-digital converter. Such converters normally accumulate data asynchronously with respect to system operation for direct transfer to the memory unit as data words. However, a data word may also be moved to process or unit singly for processing in accordance with this invention. Data transfers are also used to control peripheral unit operations.

Assume that the processor unit 22 controls the data processing system, and the memory unit contains a MOV R(1), R2(φ) instruction. The operand address R1(1) identifies a particular storage location in the analog-to-digital converter; the operand address R2(φ), the R2 register in the register memory 40. Executing this instruction transfers the contents of the identified storage register to the R2 register.

Figure 11:
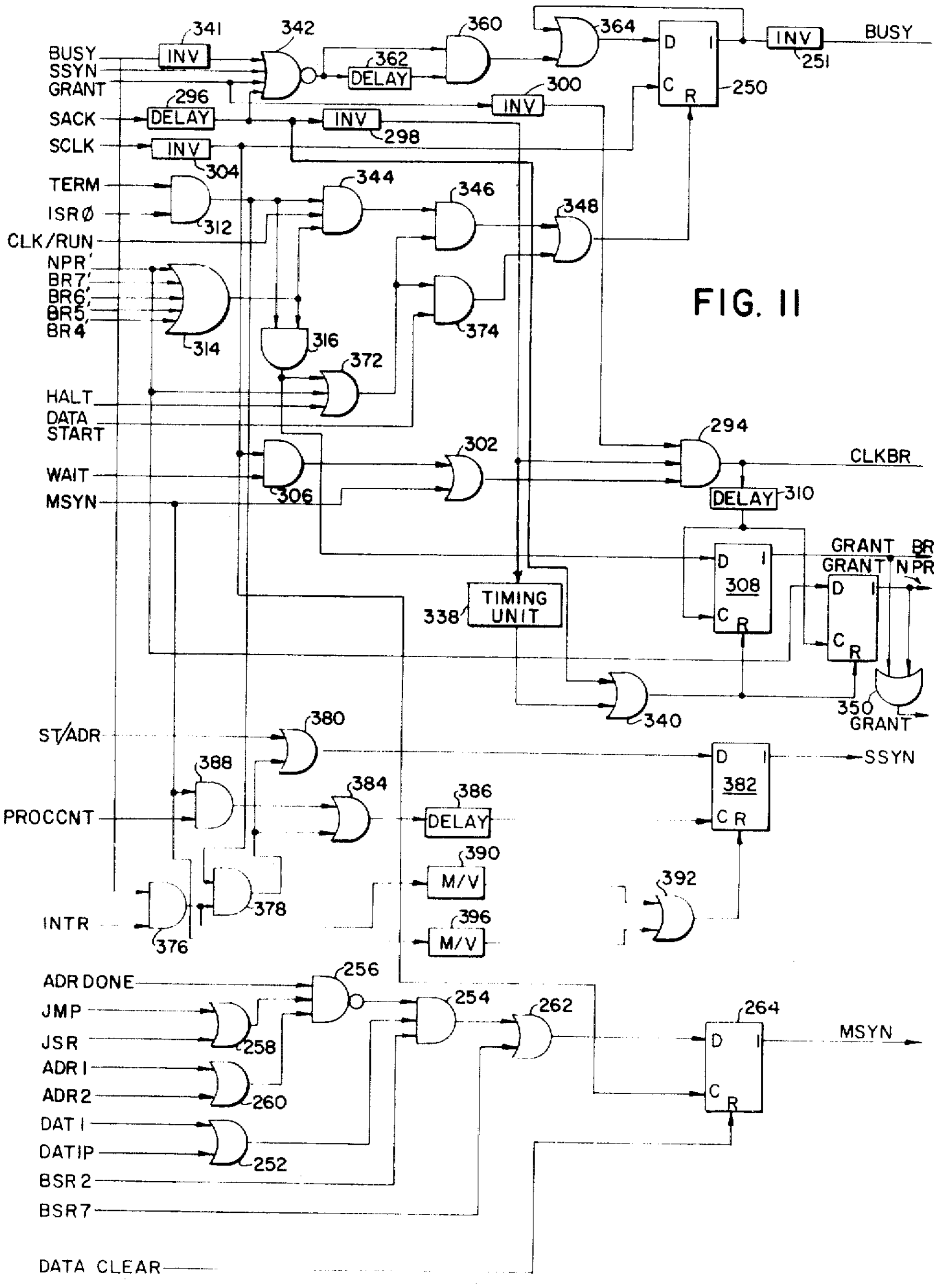
FIG. 11 is a schematic of other portions of the processor unit shown in FIG. 2 necessary for understanding of this invention.

More specifically, a "fetch" cycle from the processor unit utilizes a first DATI bus operation to obtain the instruction. The instruction address, contained in the PC register and the control signals for a DATI operation are transferred onto the bus 30. Referring to FIG. 11, a clocked flip-flop 250 has been set to generate a BUSY signal previously. A DATI or DATIP signal energizes an OR circuit 252 and enables an AND circuit 254 during a BSR–2 state unless the AND circuit is disabled by a NAND circuit 256. The NAND circuit 256 produces a disabling signal if an OR circuit 258 indicates that a JMP or JSR instruction has been decoded, if an ADR DONE signal indicates that the last DATI or DATIP operation required to decode the operand address is being performed and if an OR circuit 260 indicates that a first or second operand address is being decoded. Disabling the AND circuit 254 provides the modified addressing for the JMP or JSR instructions which was previously described. The AND circuit 254 energizes the "D" input of a clocked flip-flop 264 through an OR circuit 262 so the next inverted SCLK signal sets the flip-flop 264 and generates the master synchronization signal MSYN. The MSYN signal inhibits the completion of the BSR–3 timing state.

The address from the bus address register 34 (FIG. 2) identifies a memory location, and the MSYN signal enables the memory unit to transfer the instruction onto the DATA lines (FIG. 4) and rewrite the instruction. As described with specific reference to the peripheral unit address selection unit 112, the memory unit generates a slave synchronization signal SSYN after receiving the MSYN signal and transferring the instruction. The SSYN signal resets some internal processor unit timing circuits which assure that the peripheral unit does respond within a fixed time interval and enables the signal generator 182 to complete the BSR–3 timing state and the DATI operation. A DATA CLEAR signal is applied to the reset input of the flip-flop 264 at the completion of the data transfer to stop the MSYN in response to signal which, in turn, deenergizes the SSYN signal.

As the first operand address in the MOV instruction is a MODE–1 operand address, data is obtained from the analog-to-digital converter. The data address is transferred from the R1 register to the bus address register 34 during the BSR–1 state of a "fetch" cycle ISR–1 state. Both the address and control signals from the processor unit are coupled over the bus 30 to the address selection unit 112 for the converter shown in FIG. 12. A given set of address signals enable only one address decoder unit in the system such as unit 266 when the converter is addressed. An internal decoder including AND circuits 268, 270, 272 and 274 which are also energized by inverters 276 and 278 and directly by the ADDRESS wires, provide selection of a specific storage register or location in the converter. Enabling the AND circuit 268 selects the command and status register 102; enabling one of the AND circuits 270, 272 and 274 selects one of the data buffer 104, storage register 106 and storage register 108, respectively (FIG. 4).

Figure 12:
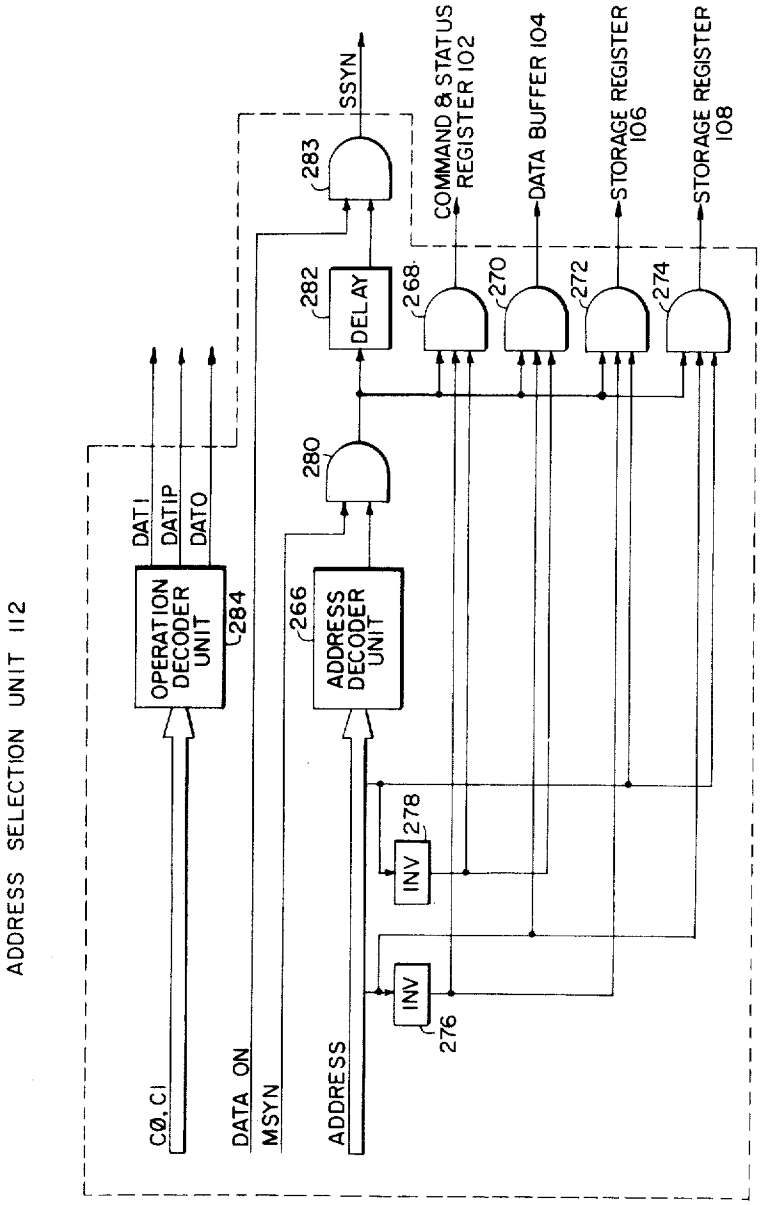
FIG. 12 is a schematic of an address selection unit for the peripheral unit shown in FIG. 4.

Still referring to FIG. 12, the MSYN signal is applied to all address selection units in the system, but only the addressed peripheral unit responds because an AND circuit 280 is energized by both the MSYN signal and the output from the address decoder unit 266. Normally, the signal from the AND circuit 280 is coupled through a delay circuit 282 to generate the SSYN signal and indicate that the data is on the bus 30. In some situations another AND circuit 283 must be enabled by a DATA ON signal to indicate that the data has actually been moved onto the bus or other conditions. Once the data is on the bus 30, it is stored in the SOURCE register (FIG. 2) in accordance with the "fetch" cycle response to a MOV instruction.

As the second operand address in the MOV instruction is a MODE–ϕ operand address, the processor unit 22 diverts to the "execute" cycle. The data stored in the SOURCE register is moved through the arithmetic unit 44 without modification for storage in the R2 register during an ISR–ϕ state and an ISR–4 state.

Assume that the second operand address is an R2(1) operand address so that the R2 register contains a data address in the memory unit; and the processor unit 22 utilizes a DATO operation to store the data as shown in FIG. 7E. During the ISR–6 state, the data address in the bus address register 34 (FIG. 2), the control signals and the data are moved onto the bus 30 simultaneously. Referring to FIG. 11, the MSYN signal is generated when the flip-flop 264 is clocked during the BSR–7 state, the BSR–7 signal being coupled through the OR circuit 262.

After the operation decoder unit 284 (FIG. 12) receives Cϕ and C1 signals which constitute cycle control signals capable of defining the DATI, DATIP and DATO operations, indicating a DATO operation, the MSYN signal and address decoder 266 energizes the AND circuit 280. The peripheral unit address selection unit 112 (FIG. 4) enables the input circuit 100 or equivalent so the data is stored at the identified location. The SSYN signal, delayed with respect to the MSYN signal, is transferred to the processor unit for resetting the processor unit and enabling the DATA CLEAR signal which resets the flip-flop 264 (FIG. 11). Then the SSYN signal is disabled.

These examples illustrate hown the processor unit uses DATO and DATI operations defined by appropriate values of the Cϕ and C1 cycle control signals to transfer information to and from specific locations within the data processing system. An instruction is obtained from a random location in the memory unit identified by the PC register using a DATI operation. Data is obtained from a specific location in the analog-to-digital converter and then is transferred either directly to the processor unit in the one example or to the memory unit in the other example.

Non-Processor Unit Transfers

Normally, an analog-to-digital converter accumulates the data in a number of storage registers. When the converter is ready to transfer that information, it is usually stored without modification in the memory unit. Similar transfers from a magnetic disc unit or to a magnetic disc unit or digital-to-analog converter are made without modification. Assume that the analog-to-digital converter accumulates two words in registers equivalent to registers 106 and 108 in FIG. 4.

Some control actions must usually be initiated by the processor unit before the data is transferred. When the converter is ready to perform a transfer, it generates a PBR signal which is coupled to an AND circuit 284 shown in FIG. 13. This AND circuit produces a BR output if two flip-flops 286 and 288 are both reset and thereby energizes an AND circuit 290. Now referring to FIG. 10, one of the clocked flip-flops 210 or 214 is set by the BR signal and a CLKBR signal. CLKBR signals are generated by an AND circuit 294 shown in FIG. 11. Specifically, the AND circuit 294 is disabled if GRANT or SACK signals exist indicating that a peripheral unit is being or has been selected. The SACK signal is coupled through a delay circuit 296 and an inverter 298 to the AND circuit 294 while the GRANT signal is coupled through an inverter 300.

If both signals enable the AND circuit 294, each MSYN signal energizes an OR circuit 302 and the AND circuit 294 to produce the CLKBR signal. This signal is also generated if the processor unit has executed a WAIT instruction. The WAIT SIGNAL FROM THE INSTRUCTION DECODER '$ (FIG. 2) and inverted SCLK signals from an inverter 304 energize an AND circuit 306 to produce CLKBR signals. Therefore, CLKBR signals are constantly being generated during system operation so the flip-flops 208, 210 and 214 are constantly updated.

Referring to FIG. 10, the gate 216 is enabled by the GRANTBR signal to couple a BG signal onto the bus 30. The GRANTBR signal is generated a fixed time after the CLKBR signal as shown in FIG. 11. The CLKBR signal is coupled to the "C" input of a clocked flip-flop 308 from a delay unit 310. As BR requests can be acknowledged only during a "term" cycle ISR-$\phi$-state, signals indicating the "term" cycle and ISR-$\phi$state energize an AND circuit 312. Any recognized NPR or BR signals from the compartator 206, and designated as NPR' and BR' signals, energize an OR circuit 314 so an AND circuit 316 applies a signal to the "D" input of the flip-flop 308 during the ISR-$\phi$state of the "term" cycle if a BR, or NPR, signal exists. Then the leading edge of the delayed CLKBR pulse sets the flip-flop 308 to produce the GRANTBR signal which is coupled to the gate 216 of FIG. 10 to transfer a BG signal onto the bus 30 from the comparator 206.

Referring to FIG. 13, the BG signal is received and the leading edge applies a clocking signal to the flip-flop 286. As the flip-flop 288 is reset, an OR circuit 318 energizes the "D" input and the BG signal sets the flip-flop 286. Setting the flip-flop 286 latches it through the OR circuit 318. The BG signal is also coupled through an inverter 320 to turn on an emitter follower transistor circuit 322 in the absence of the BG signal. A delay circuit 324 and inverter 326 couple the BG output back to the bus over a conductor 328. However, the conductor 328 is also connected to the output of an OR circuit 330.

When both flip-flop 286 and 288 are reset, the OR circuit 330 tends to produce an assertive "one" output. However, the BG wire from the bus 30 is at a logical "zero" so the transistor circuit 322 conducts and the inverter 326 produces an overriding "zero" output on the conductor 328. When the flip-flop 286 is set, the OR circuit 330 produces a "zero" output. The inverter BG signal from the bus 30 turns off the transistor circuit 322 so the inverter 326 attempts to raise the conductor 328 to a "one." However, the "zero" output from the OR circuit 330 is overriding so the BG pulse is not propogated to other peripheral units.

If a peripheral unit has not generated the PBR signal, the flip-flop 286 is maintained a reset condition by an overriding reset signal to the "R" input from an inverter 332 which is coupled through an OR circuit 334. The output from the inverter 332 is also connected directly to the "R" input of the flip-flop 288. While the OR circuit 330 tends to drive the conductor 328 to a "one," the "zero" output from the inverter 326 is overriding. When the BG pulse is applied to the inverter 320 and the "C" input of the flip-flop 286, the flip-flop 286 is not changed. After the BG pulse propogates through the delay circuit 324, the inverter circuit 326 is able to raise the conductor to an assertive "one" and thereby transfer the BG signal to the next peripheral unit.

Therefore, a first peripheral unit transfers a BG signal to another peripheral unit if the first peripheral unit has not generated a BR request. If it has generated a BR request, then the BG signal is not transferred from the first peripheral unit. In addition, an AND circuit 336 is energized by the set flip-flop 286 and the reset flip-flop 288 to produce a SACK signal indicating that a peripheral unit has been selected.

Referring to FIG. 11, the SACK signal is coupled through the delay circuit 296 and an inverter 298 to disable the AND circuit 294 and prevent further CLKBR signals. Either the signal from the delay circuit 296 or the signal from a timing unit 338, which assures that an operation occurs if no SACK signal appears after a time delay, energize an OR circuit 340 to reset the flip-flop 308.

At this time a BUSY signal, delayed SACK signal and GRANT signal energize a NOR circuit 342 (FIG. 11). This NOR circuit 342 is a circuit which determines the interval during which the data transfer can occur over a bus. When the current transfer of data is completed, the SSYN signal is de-energized and the timing signals are started. This time is indicated by a CLK RUN signal which energizes an AND circuit 344 together with the outputs of the AND circuit 312 and OR circuit 314. Therefore, if a BR request exists during the ISR-$\phi$ state of a "term" cycle and the AND circuit 316 is energized, another AND circuit 346 resets the flip-flop 250 through an OR circuit 348 thereby disabling the BUSY signal generator which the flip-flop 250 and inverter 251 represent. The GRANT signal from an OR circuit 350 energized by the flip-flop 308 is not generated, and the BUSY and SSYN signals are disabled. With the BUSY signal disabled, no unit controls the system.

Referring to FIG. 13, the SSYN signal and inverted BUSY signal from an inverter 351 energize a NOR circuit 352. After the current data unit cycle is completed and the SSYN signal subsequently is disabled, the NOR circuit 352 enables an AND circuit 354. This circuit is energized by another AND circuit 356 when the flip-flop 288 is reset and the BG signal is de-energized. As a result, the AND circuit 354 clocks the flip-flop 288 when the flip-flop 286 is set. Setting the flip-flop 288 disables the AND circuit 336 and its SACK signal output and enables an AND circuit 358 to provide a "zero" assertion busy signal from an inverter 359 to indicate the beginning of a transfer interval. This occurs after the flip-flop 250 is reset and raises the BUSY conductor to a non-assertive "one" level through the inverter 251 and thereby indicating the end of a prior transfer interval. When the BUSY signal is generated by the peripheral unit after the flip-flop 250 is reset, the peripheral unit, the converter in this example, obtains control of the system. The BUSY signal applied to the NOR circuit 342 (FIG. 11) through the inverter 343 keeps the OR circuit 364 de-energized so subsequent SCLK signals cannot set the flip-flop 250. The time delay circuit 362 prevents the flip-flop 250 from being reset during this change.

If the condition causing the PBR signal requires an interruption routine, an INEN signal is applied to an AND circuit 366 which is also energized by the BUSY signal to energize an INTR wire on the bus 30 and enable a vector gate 368 to transfer an address onto the DATA lines. The INTR signal also enables another AND circuit 370.

Referring to FIG. 11, the INTR signal is received in the processor unit by an AND circuit 376, additionally energized by the asserted BUSY signal, to enable another AND circuit 378. Then a signal is coupled through an OR circuit 380 to the D input of a flip-flop 382 during the ISR-$\phi$ state of the "term" cycle. This timing is provided by the AND circuit 312. The output from the AND circuit 378 is also coupled through an OR circuit 384 and a delay circuit 386 to clock and set the flip-flop 382. When the flip-flop 382 is set, a SSYN signal is generated. A status address signal may also be transferred through the OR circuit 380 to enable the D input. Another AND circuit 388 responds to a MSYN signal and PROCCNT signal indicating that the processor unit 22 controls the system, to provide a clock signal in this case. The output of the AND circuit 376 is also used to energize a monostable multivibrator 390 which resets the flip-flop 382 through an OR circuit 392 when the BUSY signal is deactivated. The delay provided by the monostable multivibrator circuit is sufficient to allow the data and the interruption vector to be transferred into the processor unit and defines the end of the SSYN signal from the processor unit. A similar resulting action occurs when the MSYN signal is deactivated and energizes a monostable multivibrator 396.

When the SSYN signal is received by the peripheral unit, an AND circuit 370 (FIG. 13), energized by the SSYN signal and output from the AND circuit 366, resets the flip-flop 286 through the OR circuit 334. This cancels the BUSY signal and enables the "D" input of the flip-flop 250 (FIG. 11) through the NOR circuit 342. As a result, the next SCLK pulse sets the flip-flop 250 because the resetting signal was disabled previously. The processor unit, therefore, regains system control by an active return when the processor unit generates a SSYN signal in response to an INTR signal. For other BR requests without the INTR signal, the peripheral unit merely stops generating the BUSY signal to passively return system control.

The resulting interruption routine might transfer a first memory unit address and a number representing the number of data words stored in the peripheral unit to its control section. The peripheral unit control section would also include circuitry for generating consecutive addresses beginning with the first address and MSYN signals until all words have been transferred.

In accordance with this invention, the data is stored in the memory unit without intervention by the processor unit by making transfers while the processor or other devices are not using the bus.

When all data has been assembled, such as in registers 106 and 108 (FIG. 4), the peripheral unit generates a NPR signal analogous to the BR signal. This NPR signal is coupled to the interruption priority unit 38 (FIG. 10) and specifically to the "D" input of the clocked flip-flop 208. As previously indicated, the CLKBR signals periodically clock the flip-flop 208. When the flip-flop 208 is set, it disables the comparator unit 206 to inhibit BR requests. The resulting signal is gated onto the bus 30 through a gate 215 by a GRANTNPR signal. As shown in FIG. 11, a GRANTNPR flip-flop receives the NPR′ signal from the comparator unit 206 at its D input. As a result, a delayed CLKBR signal from the delay circuit 310 sets the flip-flop and the flip-flop generates the GRANTNPR signal. The signal from the OR gate 340 resets the GRANTNPR flip-flop. NPR requests are granted after each DATO or DATI operation or during each SCLK cycle during a WAIT instruction.

When the NPG signal is received by the peripheral unit, it produces the same priority transfer sequence as previously described. The peripheral unit does not respond to the NPG signal unless it made the NPR request. If the request has been made, the NPG pulse is terminated. A SACK signal is transmitted to the processor unit which relinquishes control at the end of its current data transfer.

When the analog-to-digital counter in this example takes control, it transmits the first memory address from an address register in the address selector unit 112 and cycle control signals for a DATO operation. Then the unit 112 generates a MSYN signal. When the processor or other unit completes its current data unit cycle as signified by the generation of the SSYN signal, the converter transfers one data word to the memory. The SSYN from the memory unit tries to reset the requesting peripheral and passively returns control of the system to the processor unit by terminating its BUSY signal. If all data has been stored in the memory unit, the converter would normally generate another BR request to indicate that fact. Otherwise, the NPR signal would be generated again and the next data word would be transferred to the memory unit when the bus 30 was free again.

In summary, the analog-to-digital converter in this example is connected in a data processing system. It is identified by a unique address which can be obtained or generated like any other address in the system. This simplifies programming because a given instruction can be used to perform operation with any unit in the system. All units, whether the processor unit, memory unit or peripheral units, respond to the same set of instructions. The synchronization signals permit all transfers to be made asynchronously at an optimum rate. Data can be transferred between peripheral units independently of the processor unit or to the processor unit under its control because the various control signals and responsive circuits permit any unit to control the data processing system. The interruption priority unit and associated signals also permit control decisions to be made concurrently with other data transfers and system operations to thereby improve operating efficiency.

This invention has been described in terms of a specific illustrative embodiment of a data processing system. Examples of peripheral units, processor units and memory units have been presented with specific logical organization. It is realized, however, that many changes can be made in implementing the described invention. Different circuits and timing arrangements can be used. The circuitry necessary to provide the priority determination can be located anywhere in the system. Multiple wires, different levels of priority and alternate methods of generating the control signals can all be included in a data processing system without departing from the invention. Therefore, it is the object of the following claims to cover all such modifications and variations which come within the true spirit and scope of this invention.

What is claimed as new and desired to be secured by Letters Patent of the United States is:

1. A data unit adapted for connection to a multiple conductor bus in a data processing system, the data processing system having means for transmitting address signals, cycle control signals indicating the direction of a data transfer and a delayed first synchronization signal onto corresponding bus conductors to produce in said data unit at least one type of data unit cycle for transferring data between bus data conductors and said data unit during a transfer interval, said data unit comprising:

A. at least one data storage location with each said location having a unique address, B. selection means for generating a data unit selection signal in response to address signals on the address conductors which identify any storage location in said data unit, C. means for performing a data unit cycle during a transfer interval, D. means connected to said data unit cycle performing means and responsive to the cycle control signals for controlling the type of data unit cycle that is performed, E. coincidence means connected to said data unit cycle performing means and responsive to the coincidence of a delayed first synchronization signal and a data unit selection signal to initiate a data unit cycle, and F. means responsive to said coincidence means for generating a second synchronization signal indicative of the completion of a data unit cycle and responsive to a subsequent termination of the delayed first synchronization signal for terminating the second synchronization signal.

2. A data unit as recited in claim 1 comprising a set of data storage locations with an ordered sequence of addresses, said selection means additionally including an address decoder responsive to the address signals for selecting a specified one of said data storage location for the data unit cycle.

3. A data unit as recited in claim 1 wherein said second synchronizing signal generating means includes a delay circuit responsive to the initiation of a data unit cycle by said coincidence means.

4. A data unit as recited in claim 1 wherein said cycle control signals indicate a transfer into an identified one of said storage locations from the data conductors during the transfer interval, said second synchronization signal generating means producing the second synchronization signal to indicate the storage of the data in the identified location by said data unit cycle performing means.

5. A data unit as recited in claim 1 wherein said cycle control signals indicate a transfer from an identified one of said locations onto the data conductors during the transfer interval, said second synchronization signal generating means producing the second synchronization signal to indicate that data from the identified location has been placed on the data conductors by said data unit cycle performing means.

6. A peripheral unit adapted for controlling data transfers with another unit in a data processing system in which the peripheral units have relative priorities in the system, the system including a priority element adapted for connection to a data processing system bus having data, address and control conductor means, said peripheral unit comprising:

A. request means for transmitting a request signal onto request control conductor means when said peripheral unit is prepared to control a data transfer, B. acknowledgement means responsive to the coincidence of a request signal from said request means and the receipt of a granting signal from the priority element on a granting control conductor means by transmitting an acknowledgement signal onto an acknowledgement control conductor means, said request means terminating the request signal in response to the acknowledgement signal, C. interval indicating means responsive to the coincidence of an acknowledgement signal and the absence of a busy signal on a busy control conductor means by indicating an interval during which said peripheral unit can transfer data, D. busy signal generating means responsive to said interval indicating means for transmitting a busy signal onto the busy control conductor means, said acknowledgement signal transmitting means terminating the acknowledgement signal in response to the busy signal generating means, and E. means responsive to said busy signal generating means for controlling a data transfer over the data conductor means between the peripheral unit and another unit connected to the system bus, said busy signal generating means terminating the busy signal on completion of the data transfer operation to indicate the end of the data transfer interval.

7. A peripheral unit as recited in claim 6 wherein said data transfer control means includes:

i. means for generating address signals onto the address conductor means for another unit in the system, ii. means for generating cycle control signals onto cycle control conductor means indicating the direction of a data transfer, and iii. means for generating a delayed first synchronizing signal onto first synchronization control conductor means, the signal initiating a data unit cycle in the other unit to thereby effect the transfer during the data transfer interval.

8. A peripheral unit as recited in claim 6 wherein the data processing system additionally comprises a processor unit connected to the system bus, said peripheral unit additionally including a circuit enabled in response to certain requests for effecting a transfer of data directly to the processor, said circuit comprising i. means for transmitting a digital word onto the data conductors, ii. means responsive to said busy signal generating means for transmitting an interruption signal onto interrupt control conductor means, the processor unit accepting the digital word in response to the interrupt signal and sending a second synchronization signal onto second synchronization control conductor means for indicating the receipt of the digital word, and iii. means responsive to the second synchronization signal for disabling said interruption signal transmitting means, said digital word transmitting means and said busy signal generating means.

9. A peripheral unit as recited in claim 6 additionally comprising:

A. non-processor request means for transmitting a non-processor request onto non-processor request control conductor means, and B. means responsive to said non-processor request means and to a signal granting the non-processor request appearing on non-processor granting control conductor means for enabling said acknowledgement means, said busy signal generating means and said data transfer control means to effect a data transfer with another unit connected to the bus, said data transfer control means including means for transmitting address signals onto the address conductor means to identify the other unit to be involved in the transfer.

10. A peripheral unit as recited in claim 9 wherein said data transfer control means additionally comprises:

A. means for transmitting a delayed first synchronization signal onto first synchronization control conductor means indicating the initiation of a data transfer cycle, the other unit including means for effecting a data unit cycle in response thereto and generating a second synchronization signal onto second synchronization control conductor means indicating the completion of the data unit cycle, B. means responsive to the receipt of the second synchronization signal disabling said delayed first synchronization transmitting means, the other unit thereby terminating its second synchronization signal, and C. means responsive to the termination of the second synchronization signal for disabling said busy signal generating means to thereby terminate the data transfer interval.

* * * * *

PO-1050
(5/69)

UNITED STATES PATENT OFFICE
CERTIFICATE OF CORRECTION

Patent No. 3,815,099 Dated June 4, 1974

Inventor(s) John B. Cohen et al

It is certified that error appears in the above-identified patent and that said Letters Patent are hereby corrected as shown below:

Column 25, line 3, delete "'$" and insert --64--
line 19, delete "as"
line 46, delete "inverter" and insert --inverted--

Signed and sealed this 8th day of October 1974.

(SEAL)
Attest:

McCOY M. GIBSON JR.
Attesting Officer

C. MARSHALL DANN
Commissioner of Patents

UNITED STATES PATENT OFFICE

CERTIFICATE OF CORRECTION

Patent No. 3,815,099 Dated June 4, 1974

Inventor(s) John B. Cohen et al.

It is certified that error appears in the above-identified patent and that said Letters Patent are hereby corrected as shown below:

The term of this patent subsequent to Jan. 23, 1990, has been disclaimed.

Signed and sealed this 27th day of May 1975.

(SEAL)
Attest:

RUTH C. MASON
Attesting Officer

C. MARSHALL DANN
Commissioner of Patents
and Trademarks

ORM PO-1050 (10-69)

USCOMM-DC 60376-P69
U S GOVERNMENT PRINTING OFFICE : 869-930